United States Patent
Crichlow et al.

(10) Patent No.: US 11,167,330 B2
(45) Date of Patent: Nov. 9, 2021

(54) SELF LOADING WASTE DISPOSAL SYSTEMS AND METHOD

(71) Applicant: NuclearSAFE Technology LLC, Norman, OK (US)

(72) Inventors: Henry Crichlow, Norman, OK (US); Gary Schneider, Colorado Springs, CO (US)

(73) Assignee: NuclearSAFE Technology, LLC, Norman, OK (US)

( * ) Notice: Subject to any disclaimer, the term of this patent is extended or adjusted under 35 U.S.C. 154(b) by 0 days.

(21) Appl. No.: 16/868,128

(22) Filed: May 6, 2020

(65) Prior Publication Data

US 2020/0269291 A1    Aug. 27, 2020

Related U.S. Application Data

(63) Continuation-in-part of application No. 16/285,199, filed on Feb. 26, 2019, now Pat. No. 10,807,132.

(60) Provisional application No. 62/956,109, filed on Dec. 31, 2019.

(51) Int. Cl.
| | |
|---|---|
| *B09B 1/00* | (2006.01) |
| *E21B 41/00* | (2006.01) |
| *G21F 5/008* | (2006.01) |
| *G21F 9/34* | (2006.01) |

(52) U.S. Cl.
CPC ............ *B09B 1/008* (2013.01); *E21B 41/005* (2013.01); *G21F 5/008* (2013.01); *G21F 9/34* (2013.01)

(58) Field of Classification Search
CPC .............................. G21F 5/008; B09B 1/008
See application file for complete search history.

(56) References Cited

U.S. PATENT DOCUMENTS

| | | | | |
|---|---|---|---|---|
| 4,901,646 A | | 2/1990 | Feldman | |
| 5,245,118 A | * | 9/1993 | Cole, Jr. | ................. B09B 1/002 405/129.35 |
| 5,733,066 A | * | 3/1998 | Myers | ..................... B09B 1/002 405/129.35 |
| 5,850,614 A | * | 12/1998 | Crichlow | .................. G21F 9/34 588/17 |

(Continued)

OTHER PUBLICATIONS https://www.wikihow.com/Calculate-Terminal-Velocity.

(Continued)

*Primary Examiner* — Janine M Kreck
(74) *Attorney, Agent, or Firm* — Eric Kelly

(57) ABSTRACT

Self-loading systems and methods for disposal of waste materials in a deep underground formation may include at least one wellbore that runs from the Earth's surface to the deep underground formations, wellbore viscous fluid within that at least one wellbore, and at least one waste capsule, wherein the at least one waste capsules houses some waste and is configured to fall within both the at least one wellbore and the wellbore viscous fluid. The systems and methods may also include at least one human-made cavern located in the deep underground formation and connected to the at least one wellbore, wherein the at least one human-made cavern may be configured to receive the at least one waste capsule. The systems and methods may also include a counter for counting waste capsules and/or a robot for dropping waste capsules into a wellhead leading to the at least one wellbore.

8 Claims, 13 Drawing Sheets

(56) References Cited

U.S. PATENT DOCUMENTS

| | | | | |
|---|---|---|---|---|
| 6,190,301 B1* | 2/2001 | Murray | ............... | B09B 1/002 |
| | | | | 405/129.3 |
| 8,042,586 B2 | 10/2011 | Losey | | |
| 9,833,819 B2* | 12/2017 | Burget | ............... | B09B 1/008 |
| 10,002,683 B2* | 6/2018 | Muller | ............... | G21F 9/304 |
| 10,878,972 B2* | 12/2020 | Muller | ............... | G21F 5/008 |

OTHER PUBLICATIONS https://phys.libretexts.org/Bookshelves/University_Physics/Book%3A_University_Physics_(OpenStax)/Map%3A_University_Physics_I_-_Mechanics%2C_Sound%2C_Oscillations%2C_and_Waves_(OpenStax)/06%3A_Applications_of_Newton's_Laws/6.07%3A_Drag_Force_and_Terminal_Speed.

Chhabra, R. P., Rami, K., & Uhlherr, P. H. T. (2001). Drag on cylinders in shear thinning viscoelastic liquids. Chemical Engineering Science, 56, 2221-2227. https://doi.org/10.1016/S0009-2509(00)00507-8.

General formulas for drag coefficient and settling velocity of sphere based on theoretical law.: Yang, Hongli, Fan, Minqiang, Liu, Airong, Dong, Lianping. Department of Mineral Processing, College of Mining Engineering, Taiyuan University of Technology, Taiyuan 030024, China. International Journal of Mining Science and Technology, Mar. 2015.

"Tripping pipe", Wikipedia.com.

2017.igem.org/Team:UAlberta?Model, Edmonton, Canada.

\* cited by examiner

SELF LOADING WASTE DISPOSAL SYSTEMS AND METHOD

PRIORITY NOTICE

The present application claims priority under 35 U.S.C. § 119(e) to U.S. Provisional Patent Application Ser. No. 62/956,109 filed on Dec. 31, 2019, the disclosure of which is incorporated herein by reference in its entirety.

The present patent application claims priority under 35 U.S.C. § 720 to U.S. nonprovisional patent application Ser. No. 16/285,199 filed on Feb. 26, 2019. The present patent application is a continuation-in-part (CIP) application of the co-pending application Ser. No. 16/285,199 filed on Feb. 26, 2019.

CROSS REFERENCE TO RELATED PATENTS

This patent application is related to previous patents by one of the inventors, Henry Crichlow, related to the disposal of various types of waste in deep underground formations (rocks). These patents are:
  a. U.S. Pat. No. 5,850,614;
  b. U.S. Pat. No. 6,238,138;
  c. U.S. Pat. No. 8,933,289;
  d. U.S. Pat. No. 10,427,191; and
  e. U.S. Pat. No. 10,518,302;
the disclosures of which are all incorporated herein by reference in their entirety.

TECHNICAL FIELD OF THE INVENTION

The present invention generally relates to disposing of waste and more particularly, to (a) "self-loading" operations for waste disposal; and (b) utilization of specialized capsules or containers for waste which may be sequestered in lateral wellbores and also in human-made caverns drilled into deep geologic formations, such that, the waste is disposed of safely, efficiently, economically and in addition, if required, may be retrieved for various reasons.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

In this application, the words "capsule," "container," and "canister" may be used interchangeably with the same meaning. The term "waste" shall generally relate to any material that may be deemed necessary to be disposed of into underground geological systems (such as underground geological rock formations). Wellbores and human-made caverns relate to drilled out or constructed or human-made "void spaces" fashioned in the deep geological formations for the sequestration of the waste materials.

To date, massive drilling operations are required to drill and complete the types of wellbores and caverns needed to sequester waste in deep underground formations safely. These are expensive drilling operations and utilize sophisticated technologies and human resources. After the wellbores are drilled, however, the waste capsules (with waste inside) need to be delivered into the wellbore/caverns and disposed of safely. This can be done by the same drill rig that drilled the original wellbore. However, this is an expensive and a time-consuming means. A less expensive, more rapid means is needed to sequester the thousands of waste capsules (each housing waste) that are contemplated to be disposed of in the waste industry. This invention teaches devices, apparatus, systems, and/or methods, in which the waste material deployment can be done by "self-loading" the waste capsules into the storage wellbores and/or storage caverns without any need for expensive systems and all under the effect of gravity.

The current method for emplacing waste capsules is based on existing oilfield technology. For drilling and completion operations, various types of cylindrically-shaped components (often called 'downhole tools') are handled by the drilling rig or workover rig crews who are trained to use special equipment to pick up the tools, assemble the downhole tools in longer sections, called "work strings" as necessary, and then lower the downhole tools into the wellbore by progressively adding tubular sections of the 'work string' at/from the (Earth's/terrestrial) surface.

Each of the tubular sections of these work strings is called a 'joint,' and the standard length of each joint is approximately 30 feet. There are threaded connections on each end of a work-string joint called 'tool joints.' The design for conventional drilling rigs and workover rigs allows for two or three work-string joints to remain coupled together so they do not have to be laid down horizontally when the work string is removed from the wellbore. Instead, for efficiency of time and operational productivity, the work-string joints are unscrewed in such a manner that either two joints or three joint integral groups can be set back vertically on a designated area of the work floor.

These coupled vertical sections of the work string are called 'stands.' The top of each stand is racked in a working platform that is built into the mast or derrick of the rig approximately 60-feet or 90-feet above the rig floor. This working platform is called the 'monkey board.' Some modern rigs operate efficiently without a human involved, these are automatic monkey boards, but most rigs require a person called a 'derrick man' to go up and work on the monkey board. The derrick man guides the tops of the stands into special racking 'fingers' where they are secured until the stands are required to be lowered back into the wellbore.

Although racking the work string integrally comprising two or three joints in stands, decreases the time involved in emplacing a downhole tool or removing it from the wellbore, there is still a considerable amount of time and mechanical effort involved screwing together or unscrewing each stand and repeating the process hundreds of times. Rigs designed to accommodate stands with three 30-feet work-string joints are called 'triple' rigs. Rigs designed to accommodate stands with two 30-feet work-string joints are called 'double' rigs.

In the prior art, after the waste capsules are delivered to and stored at the well site, a generic procedure for emplacing a given waste capsule (with waste inside) with a modern conventional drilling or workover rig would involve the following sixteen (16) sequential steps:

(1) Pick up and set the waste capsules on the automatic 'catwalk' of the drilling rig. The catwalk is a long rectangular steel platform or rig equipment that provides a flat, horizontal working space or staging area for assembling downhole tools and preparing them to be picked up by the drilling rig or workover rig. The automatic catwalk can be elevated so that the end next to the rig is raised to the level of the rig floor. It also has a mechanism that allows it to push one end of the downhole tool toward the rig, or conversely, this mechanism can retract when removing downhole tools. Moreover, the automatic catwalk can be controlled remotely to protect the operator from any risk of bodily harm.

(2) Using the rig equipment, connect multiple waste capsules together so that they are the required length of a stand of the work string. For a double rig, this would be a total of about 60-feet long. For a triple rig this would be a total of about 90-feet long. The top of this assembled length of waste capsules would have a short section or 'handling sub' with the same type of tool joint as the work-string tool joints.

(3) Using the rig equipment, raise the end of the catwalk closest to the rig so that it is level with the rig floor. Push the far end of the now assembled stand-length waste capsule group a short distance onto the rig floor to allow the rig hoisting equipment to 'latch' onto the top of the tool joint of the handling sub. A specialized piece of hinged equipment called "elevators" are used to latch onto the top of the tool joint. Conventional tool joints have larger outer diameters than the tube bodies of the work string, and the elevators latch around the tube of the work string. When pulled up against the bottom of the tool joint, the weight of the work string is supported by the elevators.

(4) Using the rig hoisting equipment, which is basically a very large block and tackle system, the coupled stand-length waste capsule assembly group is picked up and it is suspended vertically over the opening in the rig floor. This opening or 'wellhead' is directly above the wellbore. The rig usually has a 'rotary table' that is centered directly above the wellbore. The rotary table has a 'bowl,' which is an equipment or bushing designed that it can accommodate the 'slips,' as described in Step (6) below.

(5) After ensuring that any shielding is removed as required, and confirming the waste capsule assembly is ready to be emplaced within the wellbore, lower the waste capsule assembly down into the wellbore.

(6) When the handling sub is level with the rotary table, set the 'slips.' The slips are a tool with hard metal dies or surfaces that are shaped to fit the outside diameter of the tubular work string. These replaceable dies are fixed to the inside of the body of the slips. The outside body of the slips is wedge-tapered. When set in the space between the opening of the rotary table and the work string, the wedging action by the tapered slips and by the tapered rotary table bowl pushes against the work string, and this force becomes stronger as the work string becomes heavier as each stand is added.

(7) As a safety feature, a removable safety clamp is also installed above the slips to ensure that the work string does not drop down the hole.

(8) With the slips set, and possibly a safety clamp has also been installed, the elevators can be unlatched so that the rig hoisting equipment can be lifted up to the height of the monkey board so that the derrick man or automatic system can latch onto another one of the stands of the work string.

(9) After latching onto a stand of the work string (of the assembly of waste capsules), the stand is picked up by the rig hoisting equipment where it is high enough so that the bottom threaded connection of the stand can be inserted into the threaded connection on the top of the tool joint of the handling sub that is set in the rotary table.

(10) The stand (including the assembly of waste capsules) is then screwed into the tool joint of the handling sub and the connection is made up with a precise amount of torque to ensure that the connection cannot be unscrewed inadvertently.

(11) The hoisting equipment then picks up the stand, including the stand-length capsule assembly at its lower end, so that safety clamp can be removed, and the slips can be picked up and removed from the rotary table.

(12) The work string and waste capsule assembly is lowered into the wellbore and the slips are set just below the tool joint of the top joint in the stand. Since the waste capsule assembly is then 90-feet below the rotary table, precautions to protect the rig crews from radiation (if the waste to be disposed of was radioactive) can be relaxed at this time.

(13) Additional stands of the work string are added to the work string and it is lowered one stand at a time until it reaches the bottom of the wellbore. This repetitive operation, which involves assembling stands of the work string and then lowering the work string, is often referred to as 'tripping into the hole.'

(14) Once the waste capsule assembly is in place, the work string is either manipulated by various methods and/or pump pressure is applied internally to release the waste capsule assembly from the work string.

(15) The work string is then pulled out of the wellbore, often termed 'tripping out of the hole.' This operation is similar to tripping into the hole, but in reverse.

(16) Once the work string has been tripped out of the hole, another waste capsule assembly can then be picked up to repeat the process of emplacing waste capsules in the wellbore.

Tripping the work string in and out of the hole usually takes a considerable amount of time, depending on the drilling or workover rig equipment, the expertise of the crews, the wellbore depth, etc. Moreover, this operation entails certain risks. In a typical 10,000-foot wellbore, tripping may require several hours to complete a single trip for each work string (including the assembly of waste capsules) disposed in the wellbore.

The above noted prior art current approach to inserting devices or tubular goods into a wellbore is composed of "running" these downhole devices, tools, and/or capsules collectively in sequential strings by joining them together at the surface, then repeatedly deploying the completed strings into the wellbore. As noted, this is usually done with the use of the drilling rig and its equipment or in some cases a specialized smaller rig called a "pulling unit" which is usually less expensive to operate. In either case, it is a tedious, repetitive, and historically accident-prone operation. Operating a full-sized drilling rig can cost upwards of $701,000 per day. This is a major expense to "land" or insert the capsules in a wellbore. Inserting several thousand capsules would cost hundreds of thousands of dollars over several weeks of rig operational time.

Furthermore, the rig crews are exposed to moving heavy equipment; and this increases the risk of serious accidents which could result in bodily harm, and which could also include loss of human life. There is also the risk of dropping the work string and damaging the waste capsules due to the weight of the work string directly above the waste capsule assembly.

This above noted prior art approach is expensive, prone to accidents, and is a very time-consuming means. A less expensive, safer, more rapid means is needed to sequester the thousands of waste capsules (with waste) that are contemplated to be disposed of in deep boreholes by the waste industry.

This invention teaches novel devices, apparatus, systems, and/or methods in which the waste material deployment may be done by "self-loading" the waste capsules into the storage wellbores and/or storage caverns without any need for expensive systems and all under the effect of gravity.

It is well known that in gravitational flow in pipes, there is a scientific relation between the settling velocity in the pipe of a body and the viscosity of the fluid through which the body is falling. The final velocity reached by the body under the effects of gravity is called the terminal velocity. This velocity is dependent on the fluid viscosity and the geometry of the body. It is, therefore, possible for a body to be geometrically designed such that its terminal velocity can be controlled while at the same time the viscosity of the fluid medium can also be controlled such that the combination of these modifications provides for a selected terminal velocity that provides for safe and accident-free disposal.

This can be readily done by a combination of waste capsule body design and geometry and fluid viscosity manipulation. Waste capsule design geometry may change a rate of the waste capsule falling in the wellbore under gravity due to streamline flow effects around the falling body and further, by the inherent stability of a well-designed waste capsule during the free fall. In addition, manipulation of the fluid viscosity changes, within the wellbore/cavern, can speed up or slow down the rate of descent of the waste capsule through these viscous fluid(s). The prior art does not allow for such simultaneous combinations of streamlined waste capsule design and fluid viscosity properties. In a departure from the prior art of running capsular waste systems into wellbores, this invention proposes to do both.

Based on the inherent shortcomings of the prior art, there exists a critical need for an effective, economical method for developing and utilizing an acceptable process for loading the waste capsules (with waste) into the geological storage (e.g., wellbore and/or human made cavern within a deep geological formation); a process that precludes the need for all the expensive, time-consuming, and dangerous surface operations that are currently being used or contemplated, to position the waste capsules in deep underground repositories. An approach is needed that minimizes the steps required for deployment, maximizes the speed of operation, is safer, and is more cost-effective.

In order to solve the above-described problems, the present invention provides devices, apparatus, systems, and/or methods to dispose of the waste currently accumulating on the surface and to sequester it in geological formations connected via boreholes, principally with the help of gravity. With this in mind, the devices, apparatus, systems, and/or methods taught in this patent application involves effective cost savings and efficiency gains by implementing a "self-loading," almost automatic sequestration of the waste capsules from the surface into the wellbore and ultimately into the lateral wellbores and/or storage caverns.

It is to these ends that the present invention has been developed.

BRIEF SUMMARY OF THE INVENTION

To minimize the limitations in the prior art, and to minimize other limitations that will be apparent upon reading and understanding the present specification, the present invention describes devices, apparatus, systems, and/or methods for loading (e.g., self-loading) waste materials into wellbores and/or human made caverns located within closed and deep geological formations, using waste-capsules (waste containers). Devices, apparatus, systems, and/or methods of disposing of waste in underground rock formations is disclosed by the present invention.

"Self-loading" in this patent application may be used to describe processes/methods in which waste capsules (housing waste) may be loaded into wellbores without any external force except that of gravity.

In addition, the invention teaches a novel means of loading the waste capsules into the subterranean storage systems by "dropping" the waste capsules from the surface or wellhead, into the wellbores which are fluid-filled with a fluid of known and controlled (predetermined) viscosity. This fluid medium (of predetermined viscosity) acts specifically as a viscous damper, brake or retarder and slows the waste capsules' fall during their descent in the wellbore such that a sufficiently/desired low terminal velocity is reached (or not exceeded). This calculated terminal velocity allows the waste capsules to "land" themselves in the wellbore and/or human made cavern storage systems safely and without significant damage or breakage (to the waste capsules, the wellbores, or to the caverns). This approach allows for rapid deployment of hundreds of waste capsules in a relatively short time.

The present invention is concerned with disposing of waste and, more specifically, to devices, apparatus, systems, and/or methods of disposing of encapsulated waste in deep underground closed rock formations using multilateral horizontal boreholes (wellbore) and/or human-made caverns connected to the surface by at least one vertical wellbore. More specifically, the invention describes devices, apparatus, systems, and/or methods in which a novel waste capsule loading system and a novel deployment process are illustrated to provide a safe long-term waste repository.

An object of the present invention is to provide a method of disposing of waste in deep underground rock formations.

Another object of the present invention is to provide a method of disposing of waste in underground rock formations which will provide for a rapid, repetitive means of safely controlling the disposal of the encapsulated or containerized material waste.

It is possible to provide a method of disposing of waste in underground rock formations which will bury the waste in horizontally extending lateral boreholes positioned well below the Earth's surface or into human-made caverns similarly deployed deep in geologic formations and thus very remote from the ecosphere.

It is possible to provide a method of disposing of waste in deep closed underground rock formations wherein the design of the waste capsule (or waster container or waste canister) provides several novel features and also allows a rapid deployment of the subject waste capsules into wellbores. In addition, the systems and/or processes taught herein may allow for: personnel safety on the surface during surface and disposal working operations and/or economic and operational efficiencies in sequestering the waste underground.

In some embodiments, operational methods may teach landing and/or loading at least one waste capsule into a given wellbore (or system of wellbores). In this operational method, the recommended tasks involved provide a more efficient methodology to allow safer, more economical disposal of the waste in the deep underground repositories.

A very significant existing consideration to be addressed may be a need for rapid deployment of the waste material from the surface. These waste capsules may be radioactive in some embodiments; and as such, they need special protected handling and relatively quick disposal times. The shorter the time that these radioactive devices are allowed to be within the working area or storage environment on the surface area of human operation, the less chance there is of an accident of dangerous exposure to humans and/or the environment (ecosphere).

In some embodiments, a means may be utilized to manipulate the viscosity of the wellbore fluid medium to control its viscosity. Viscosity modification is a standard process in many industries, and today (2020) can be effectively and cheaply accomplished. In addition, many natural or synthetic fluids have viscosity ranges that would lend them to be an ideal candidate for use as the fluid media in this invention. These naturally occurring and readily available liquids may include heavy oils, sometimes referred to as low gravity crudes. These oils have viscosities that range from flowable liquids to almost semi-solids. They are also very inexpensive, e.g., currently only costing a few dollars per barrel. Synthetic fluids can also be customized and designed to achieve the desired results (e.g., of having a predetermined and predefined viscosity). Further beneficial properties of the viscous fluids may include: that they are generally capable of acting as lubricants in the wellbore, minimizing frictional effects; acting as a heat sink in the wellbore; and/or also acting as a non-corrosive blanket environment inside the wellbore.

In some embodiments, the exterior geometry of the given waste capsule is designed or manipulated with the surrounding viscous fluid in mind, to optimize the settling velocity of the falling body (i.e., of the falling waste capsule). This type of design is readily done today. The computational power and simulation platforms available for prototype design are widely available in a host of industries from aerospace to mechanical design. The optimal design of a given waste capsule will not be a major problem given the vast power and ubiquitous nature of design technologies.

In some embodiments, the waste capsule system may have added physical means to modify its falling velocity during passage through the wellbore fluid(s). These attachments may change the dynamics of flow around the given waste capsule and also minimize undesired vortices and/or eddies which may create side to side movement (translational), or also rotational movement thereby creating various instabilities in the waste capsule as it falls.

In some embodiments, the waste capsule system may have added physical means to minimize the impact of the given waste capsule when it reaches a bottom or when it contacts another capsule already landed in the wellbore. A crushable zone may be implemented as part of the given waste capsule to minimize impact damage (e.g., at the leading edge and/or trailing edge of the given waste capsule).

In some embodiments, the waste capsule system may have added physical means to allow the falling waste capsule to connect passively with an already landed waste capsule in the wellbore ahead of the then current falling waste capsule (e.g., such that is a removal of the landed waste capsules is desired, a string of connected waste capsules may be withdrawn from the wellbore).

In some embodiments, the waste capsule system may have added physical means to allow for connection and retrievability of the capsule from the wellbore.

In some embodiments, one or more intercept or support wellbores may be drilled from the surface of the Earth to intercept and connect to the given human-made cavern at or near the bottom of the given human-made cavern. This embodiment may allow for bi-directional communication of fluid(s) and/or material(s) from the Earth's surface to the internal void space of the given human-made cavern. The utility of this embodiment is that the given human-made cavern and connecting wellbore systems may be purged of fluid(s) and/or material(s) and then allow introduction of different types of fluid(s) as needed/desired to implement the self-loading process. For example, after use, the initial controlled viscosity fluid used in the initial self-loading process may be removed from the given human-made cavern by injecting a displacing fluid in either direction from the Earth's surface to purge that human-made cavern and the wellbore. The final sealing fluid(s) and/or material(s) may then be placed in that human-made cavern.

The foregoing and other objects, advantages, and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. The drawing figures are also not necessarily drawn to scale.

FIG. 1B also illustrates a portion of a sealing fluid or slurry 27A injected and lying below the original viscous fluid 27 which is resident above the slurry 27A.

FIG. 6 may show a robotic system and a waste capsule being loaded into a wellbore wellhead at the surface using the robotic system.

REFERENCE NUMERAL SCHEDULE

Figure 5A:
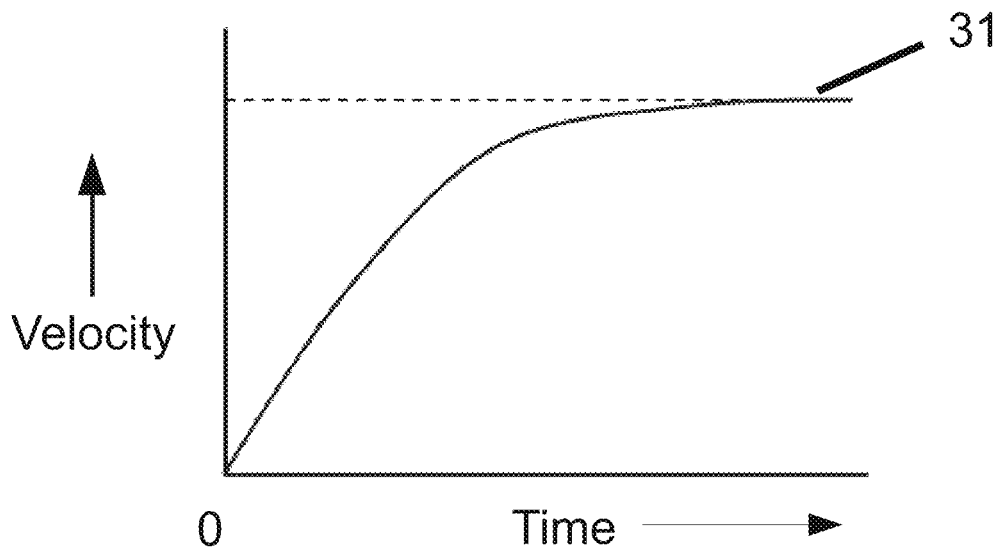
FIG. 5A illustrates graphically a concept of velocity versus time for a falling object, showing an achieved terminal velocity of the falling body under gravity.

With regard to the reference numerals used, the following numbering is used throughout the various drawing figures.
5a self-loading waste disposal system 5a
5b self-loading waste disposal system 5b
5c self-loading waste disposal system 5c
5d self-loading waste disposal system 5d
7 remote waste storage 7
8 wellsite waste storage 8
9 Earth's (terrestrial) surface 9
10 drilling rig 10
10a drill rig floor 10a
15 vertical wellbore 15
15a wellhead 15a
15b secondary support or intercept wellbore 15b
20 primary lateral wellbore 20
20a secondary lateral wellbore 20a
20b S-shaped wellbore section 20b
24 waste 24
25 waste capsule 25
25a leading-edge 25a
25b stabilizer 25b (trailing edge 25b)
25c rear connector 25c
25d steel casing 25d
25e centralizers 25e
25f capsule being transported in clamp 25f
25g capsule being inserted in wellhead of wellbore 25g
25h internal stabilizer fin 25h
25i external stabilizer fin 25i
25j drag vanes 25j
25k capsule body 25k
25l self-coupling system 25l
26a slow or stagnant velocity region 26a
26b increasing velocity region 26b
26c high-velocity region 26c
27 wellbore viscous fluid 27
27a injected sealing fluid (slurry/cementitious) 27a
28 automatic robotic system 28
28a robotic clamp device 28a
28b communicative means 28b
30 cement 30
31 terminal velocity 31
32 casing 32
38 rock formation (deep geological formation) 38
39 capsule counter system 39
40 waste storage cavity 40
700 method of self-loading waste in deep underground formations 700
701 step of designing a capsule system and determining a critical time interval 701
705 step of transporting waste to disposal well site 725
710 step of stacking capsules at well site 710
715 step of storing capsules at well site 715
720 step of using automatic robotic systems to select waste capsule 720
725 step of using a computer-controlled system 725
730 step of checking total quantity of dropped waste capsules 730
735 step of inserting waste capsules into wellbore at prescribed time intervals 735
740 step of determining a time interval for dropping waste capsules 740
745 step of dropping a waste capsule in wellbore 745
750 step of counting dropped/released waste capsules 750
755 step of sealing wellbores/wellhead 755

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention.

In this patent application, the words "well," "wellbore," and/or the like may be used interchangeably and refer to cylindrical elements implemented in the design and installation processes. References to well and/or wellbore without use of an accompanying reference numeral may refer to any of the wellbore sections discussed herein, such as, vertical wellbore 15, primary lateral wellbore 20, secondary lateral wellbore 20a, and/or S-shaped wellbore section 20b.

In this patent application, the words "capsule," "container," "carrier tube," "canister," and/or the like may be used interchangeably with the same meaning, e.g., specifically referring to at least one waste capsule 25 or portion thereof.

In this patent application, the words "waste," "waste form," "waste material," "waste product," and/or the like are used synonymously and refer to various types of material to be disposed of in a deep geological formation/system.

Figure 1A:
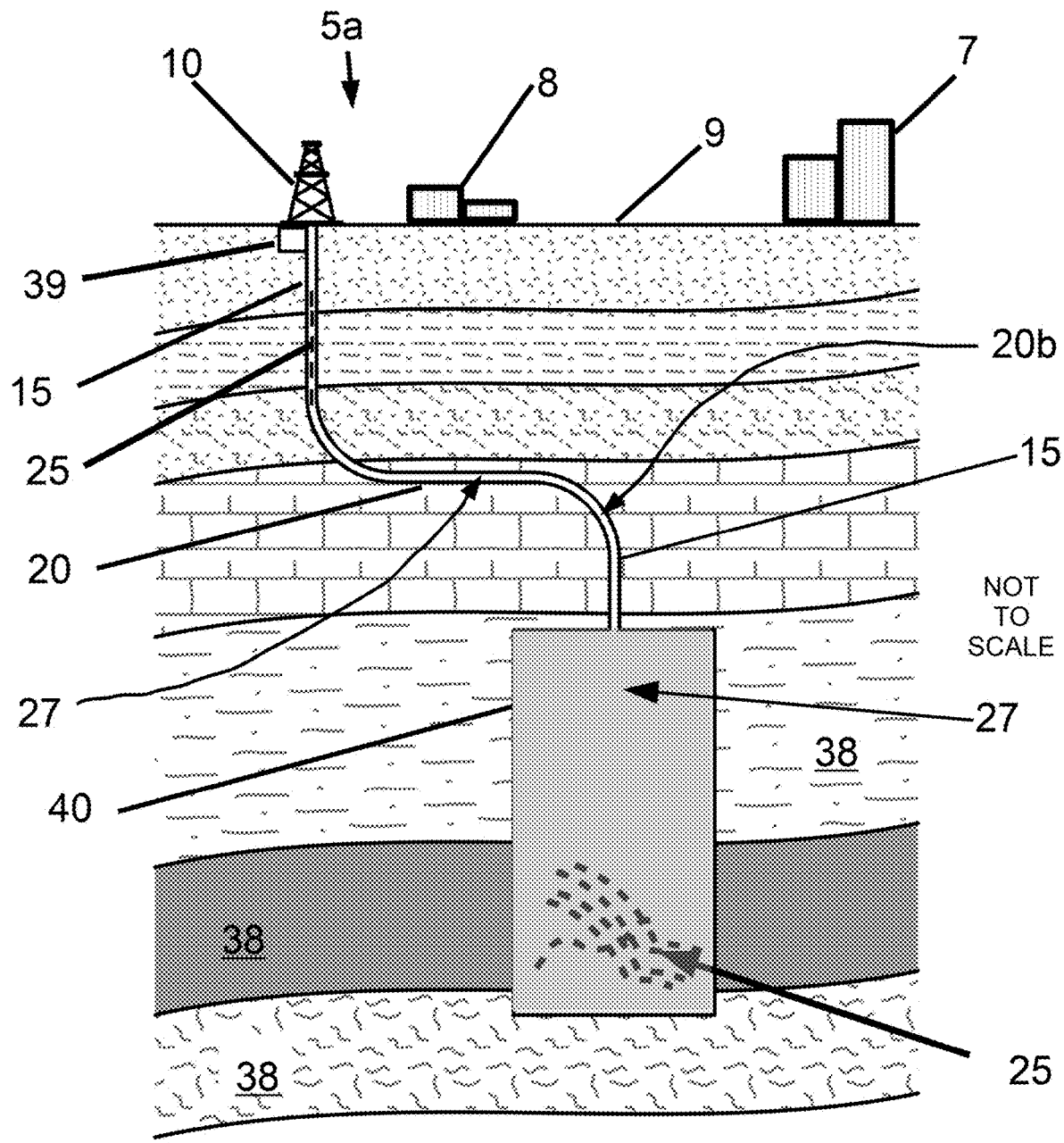
FIG. 1A shows a generalized cross-sectional diagram view of a waste system, comprising at least one human-made cavern located at least partially within a deep geological formation, configured for receiving waste capsules; and a system of wellbores running/connecting the at least one human-made cavern to the Earth's surface. Various surface equipment is also shown in this figure.

FIG. 1A may be a schematic cross-sectional view illustrating an inclusive overview of at least a portion of a waste disposal wellbore and human-made cavern system 5a. In some embodiments, this waste disposal wellbore and human-made cavern system 5a may comprise at least one human-made cavern 40 and at least one wellbore that connects the surface (Earth's surface 9) to this at least one human-made cavern 40, wherein the at least one human-made cavern 40 may be located within deep-geological-formation 38, and wherein the at least one human-made cavern 40 may be configured for receive/house waste. In some embodiments, the at least one human-made cavern 40 may be configured to receive/house a plurality of waste capsules 25 (with waste). In some embodiments, this waste disposal wellbore and human-made cavern system 5a may further comprise at least one waste capsule 25. In some embodiments, the at least one wellbore may comprise at least one vertical wellbore 15. In some embodiments, the at least one wellbore may comprise vertical wellbore 15 and at least one primary lateral wellbore 20. In some embodiments, the at least one wellbore may comprise vertical wellbore 15, the at least one primary lateral wellbore 20, and at least one secondary lateral wellbore(s) 20a. In some embodiments, vertical wellbore 15, the at least one primary lateral wellbore 20, and/or the at least one secondary lateral wellbore(s) 20a may be as described below in the discussion of FIG. 1D. For example, and without limiting the scope of the present invention, a primary vertical wellbore 15, may be drilled from the surface (Earth's surface 9) to a depth between substantially 5,000 and 30,000 feet from the surface. In some embodiments, the at least one wellbore may terminate in the at least one human-made cavern 40. In some embodiments, the at least one wellbore may terminate into a plurality of human-made caverns 40, see e.g., FIG. 1C. In some embodiments, the human-made cavern 40 may be implemented in the deep geologic formation 38. Implemented from the at least one wellbore may be a plurality of human-made caverns 40 (or at least one human-made cavern 40) which may be disposed at different azimuth angles around the at least one wellbore. In some embodiments, the section of the at least one wellbore that connects to a given human-made cavern 40 may be a S-shaped wellbore section 20b.

Figure 1B:
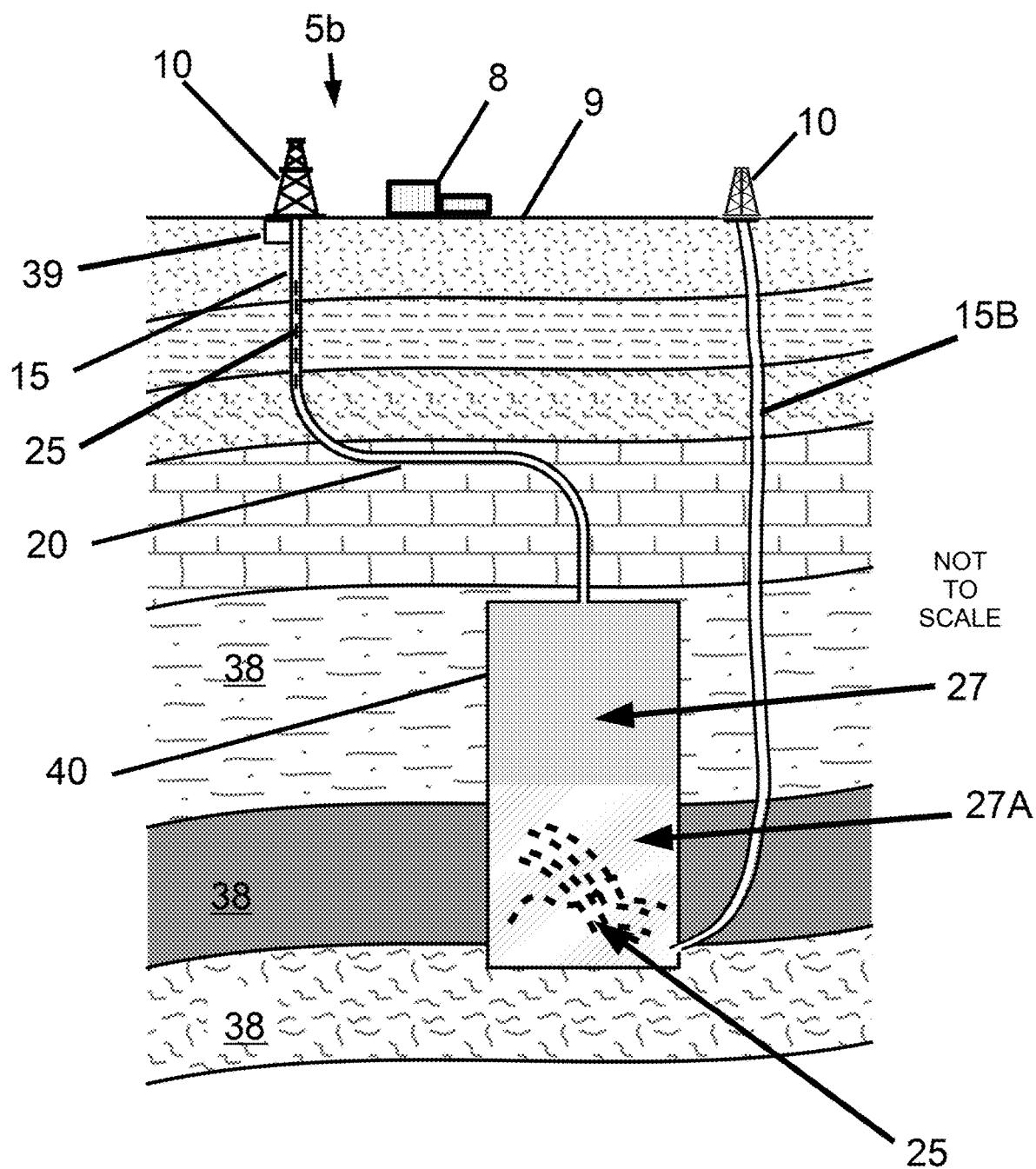
FIG. 1B a similar embodiment and similar view as that of FIG. 1A, except in FIG. 1B, the waste system may further comprise at least one support or intercept wellbore linking the at least one human-made cavern to the Earth's surface. This secondary intercept wellbore may be designed to intersect/enter the at least one human-made cavern at or near the bottom of that at least one human-made cavern.

Continuing discussing FIG. 1B, in some embodiments, one or more curved S-shaped wellbore section(s) 20b may emanate (e.g., derive) from the at least one wellbore, such as, from vertical wellbore 15, from primary lateral wellbore 20, and/or from secondary lateral wellbore 20a. In some embodiments, a given S-shaped wellbore section 20b may connect the at least one wellbore to a given human-made cavern 40. In some embodiments, a given S-shaped wellbore section 20b may comprise a first vertical section connected to a lateral section and finally connected to a final vertical section that connects to the given human-made cavern 40.

Continuing discussing FIG. 1B, in some embodiments, because a lateral (horizontal) section of a given curved S-shaped wellbore section 20b may differ in length, because more than one human-made cavern 40 may be implemented from a single curved S-shaped wellbore section 20b, a downward/final vertical section of the given curved S-shaped wellbore section 20b may also vary, e.g., get longer, to allow a sufficient length of vertical wellbore section to exist, such that drilling the curved portion is more easily operationally possible since sufficient weight from that vertical section of wellbore 15 is mechanically transmitted to the drill bit system of the drill rig 10 to enhance the rate of penetration during drilling and reaming operations.

In some embodiments, the at least one wellbore, vertical wellbore 15, primary lateral wellbore 20, secondary lateral wellbore 20a, curved S-shaped wellbore section 20b, other wellbores, portions thereof, combinations thereof, and/or the like may have predetermined and/or fixed (but possibly different) diameters. For example, and without limiting the scope of the present invention, in some embodiments, such wellbore diameters may be selected from a range of substantially six inches to substantially 48 inches, plus or minus one inch.

In some embodiments, the at least one wellbore, vertical wellbore 15, primary lateral wellbore 20, secondary lateral wellbore 20a, curved S-shaped wellbore section 20b, other wellbores, portions thereof, combinations thereof, and/or the like may have predetermined and fixed (but possibly different) lengths. For example, and without limiting the scope of the present invention, in some embodiments, such lengths may be selected from a range of substantially two hundred feet to substantially twenty-five thousand feet, plus or minus one foot.

In some embodiments, the at least one wellbore, vertical wellbore 15, primary lateral wellbore 20, secondary lateral wellbore 20a, curved S-shaped wellbore section 20b, other wellbores, portions thereof, combinations thereof, and/or the like may be "cased." In some embodiments, such casing may be lining the given wellbore with steel pipe(s) (casing) of fixed, by varying, predetermined sizes (e.g., length, diameter, thickness, etc.) (see e.g., casing 32 in FIG. 3). In some embodiments, it may be contemplated that the steel casings that line the wellbores shall be coupled together by flush steel couplings such that there is a completely smooth internal bore inside the wellbores. This allows for easy and uninterrupted disposal of the self-loaded waste capsules 25 which move down the wellbores. In some embodiments, parts (regions, portions, and/or sections) of a given wellbore may remain without casing; e.g., "open-hole" if a given rock formation 38 may be very well consolidated.

In some embodiments, the at least one wellbore, vertical wellbore 15, primary lateral wellbore 20, secondary lateral wellbore 20a, curved S-shaped wellbore section 20b, other wellbores, human-made cavern 40, portions thereof, combinations thereof, and/or the like may comprise (e.g., house/have) wellbore viscous fluid 27. In some embodiments, the at least one wellbore, vertical wellbore 15, primary lateral wellbore 20, secondary lateral wellbore 20a, curved S-shaped wellbore section 20b, other wellbores, human-made cavern 40, portions thereof, combinations thereof, and/or the like may be at least partially filled with wellbore viscous fluid 27. In some embodiments, wellbore viscous fluid 27 may be configured to control a velocity (e.g., a terminal velocity 31, see FIG. 5A) of a given waste capsule 25 that may be falling within the waste system 5a. Some examples of wellbore viscous fluid 27 may be: specially modified drilling muds with controlled viscosities; low gravity crude oils; synthetic hydrocarbon derived products; viscous foams; combinations thereof, and/or the like.

Note reference numerals 27 (and 27a) in the figures, along with their respective lead lines and/or arrows, are intended to indicate that given wellbore sections, given casings 32 sections, and/or human-made caverns 40 may be filled and/or housing wellbore viscous fluid(s) 27 (and/or) injected sealing fluid(s) 27a.

Continuing discussing FIG. 1A, in some embodiments, a given human-made cavern 40 may have a diameter from 12 inches to 720 inches, plus or minus 6 inches. In some embodiments, a given human-made cavern 40 may have a height or vertical length of 500 feet to 10,000 feet plus or minus 701 feet. In some embodiments, the given human-made cavern 40 may be formed by under reaming operations. See e.g., U.S. nonprovisional patent application Ser. No. 16/285,199, filed on Feb. 26, 2019, by inventor Henry Crichlow regarding human-made caverns, making them, and their location within deep geological formation 38. The disclosure of U.S. nonprovisional patent application Ser. No. 16/285,199 is incorporated herein by reference in its entirety.

Continuing discussing FIG. 1A, in some embodiments, the waste disposal wellbore system 5a (with or without at least one human-made cavern 40) may also comprise at least one capsule counter system 39. In some embodiments, the at least one capsule counter system 39 may be configured to determine and count how many waste capsules 25 have passed the at least one capsule counter system 39 within a given portion of the at least one wellbore (e.g., a portion of vertical wellbore 15). In some embodiments, the at least one capsule counter system 39 may be attached to a portion of the at least one wellbore. In some embodiments, the at least one capsule counter system 39 may be located below drill rig floor 10a and/or below drilling rig 10. In some embodiments, the at least one capsule counter system 39 may be located proximate to: drill rig floor 10a (see e.g., FIG. 6), drilling rig 10, and/or wellhead 15a (see e.g., FIG. 6), wherein proximate may be 30 feet or less. In some embodiments, the at least one capsule counter system 39 may comprise counting means for counting waste capsules 25. In some embodiments, this counting means may comprise one or more sensors, circuits, controllers (e.g., with processors/microprocessors and with firmware and data storage memory), wherein these elements may be operatively connected to each other. In some embodiments, the one or more sensors may be motion detection based, optics based, ultrasound based, magnetic based, resistance based, inductance based, impedance base, combinations thereof, and/or the like.

FIG. 1A also shows remote waste storage 7, wellsite waste storage 8, and drilling rig 10. Remote waste storage 7 may be where the waste to be stored long-term within the given deep geological formation 38 is currently being stored (e.g., in surface pools and/or surface casks). Remote waste storage 7 may be an undesired location for long-term storage of the waste. Remote waste storage 7 may be located remotely with respect to one or more of: drilling rig 10, wellsite waste storage 8, wellhead 15a, vertical wellbore 15, and the like. In some embodiments, remote waste storage 7 may not be part of a given wellbore based waste storage system 5a. In some embodiments, a given remote waste storage 7 may be part of a given wellbore based waste storage system 5a. In some embodiments, wellsite waste storage 8 may be located onsite with respect to one or more of: drilling rig 10, wellhead 15a, vertical wellbore 15, and the like. In some embodiments, wellsite waste storage 8 may be configured for the short term storage of the waste to be stored/disposed of within the given deep geological formation 38. In some embodiments, wellsite waste storage 8 may be configured for the short-term storage of the waste capsules 25 (with waste). In some embodiments, in addition to the at least one wellbore, a given wellbore based waste storage system 5a may further comprise one or more of: drilling rig 10, wellhead 15a, drill rig floor 10a, wellsite waste storage 8, at least one human-made cavern 40, at least one waste-capsule 25, and/or capsule counter system 39.

FIG. 1B may be substantially similar to FIG. 1A, except in FIG. 1B, the waste system 5b may further comprise at least one support or intercept wellbore 15b linking the at least one human-made cavern 40 to Earth's surface 9. In some embodiments, system 5b may comprise at least some of the elements of system 5a, and may also comprise at least one support or intercept wellbore 15b. In some embodiments, this secondary intercept wellbore 15b may be designed to intersect/enter the at least one human-made cavern 40 at or near the bottom of that at least one human-made cavern 40. FIG. 1B also illustrates a portion of a sealing fluid 27A injected and lying below the original wellbore viscous fluid 27 which is resident above the sealing fluid 27A. In some embodiments, the waste disposal wellbore and human-made cavern system may further comprise at least one support or intercept wellbore 15b for each human-made cavern 40 in the system (linking that human-made cavern 40 to Earth's surface 9). In some embodiments, the waste disposal wellbore and human-made cavern systems 5a, 5b, 5c, and/or 5d may further comprise one or more of: wellbore viscous fluid 27 and/or injected sealing fluid 27a. In some embodiments, secondary intercepting wellbore 15b may be implemented in the physical system to allow for bi-directional communication between Earth's surface 9 and the given human-made cavern 40. In some embodiments, one or more comparably small diameter wellbores 15b may be drilled adjacent to but separate from the original vertical wellbore 15. In some embodiments, this new small diameter wellbore 15b may generally be drilled very quickly and very inexpensively. In some embodiments, this wellbore 15b may have a diameter of 4 inches to 8 inches, plus or minus 1 inch. In some embodiments, one or more new connecting wellbores 15b may intersect a given human-made cavern 40 at one or more points and provide communicative means (e.g., wellbore/channel) with and from Earth's surface 9, via this at least one support or intercept wellbore 15b. In some embodiments, this communication channel may allow for two-way communication with Earth's surface 9. In some embodiments, this physical communication means may allow injection, circulation, purging, and/or placement of various types of fluids and material forms (e.g., injected sealing fluid 27a) to and from (bi-directionally) Earth's surface 9 to/from a given human-made cavern 40. In some embodiments, at least one support or intercept wellbore 15b may allow, that during the process of disposal, the injection a liquid or slurry material (e.g., injected sealing fluid 27a) into the given human-made cavern 40, wherein that given human-made cavern 40 may be at least partially filled with waste capsules 25 (containing waste), and further that injected liquid/slurry may fill into void spaces that may exist between, and/or in and around the physical waste capsules 25 located within that given human-made cavern 40. In some embodiments, the injection of a sealing, cementitious and/or slurry type of fluid material (e.g., injected sealing fluid 27a) may be injected from Earth's surface 9, via the support wellbore 15b, and into the given human-made cavern 40. In some embodiments, such injection of injected sealing fluid 27a, via the support wellbore 15b, and into the given human-made cavern 40, may then displace/replace at least some of the original viscous fluid 27 that may have been present in the given human-made cavern 40. In some embodiments, injected sealing fluid 27a may be a slurry and/or cementitious. Some examples of injected sealing fluids 27a may be: bentonites or other clay suspensions; tars; bitumen; heavy crude oils; high temperature hydrocarbon derived products; vermiculite activated media; carbon nanotubes; combinations thereof, and/or the like. In some embodiments, injected sealing fluid 27a may have a higher density than wellbore viscous fluid 27. In some embodiments, this injection of the injected sealing fluid 27a into the void spaces between and in and around the waste capsules 25 (located in the given human-made cavern 40 and/or in a wellbore) may provide a long-lived sealing mechanism for this disposal method, such that when the injected sealing fluid 27a are "set up" or hardened/solidified, the waste capsules 25 and the injected sealing fluid 27a essentially form a solid impermeable monolith of buried material, that may be thousands of feet below Earth's surface 9. In some embodiments, injected sealing fluid 27a may be longer lived than wellbore viscous fluid 27. In some embodiments, injected sealing fluid 27a may have greater stability over wellbore viscous fluid 27.

Continuing discussing FIG. 1B, in some embodiments, an injection process of injecting injected sealing fluid 27a into a given human-made cavern 40, may involve a reverse circulation operation in which the displacing injected sealing fluid 27a is injected down the original vertical wellbore 15 into the given human-made cavern 40, filling the void spaces between and in and around the waste capsules 25, and displacing the original wellbore viscous fluid 27 via the support wellbore 15b, allowing the original wellbore viscous fluid 27 to reach Earth's surface 9 (and be collected, if needed for re-use).

Figure 1C:
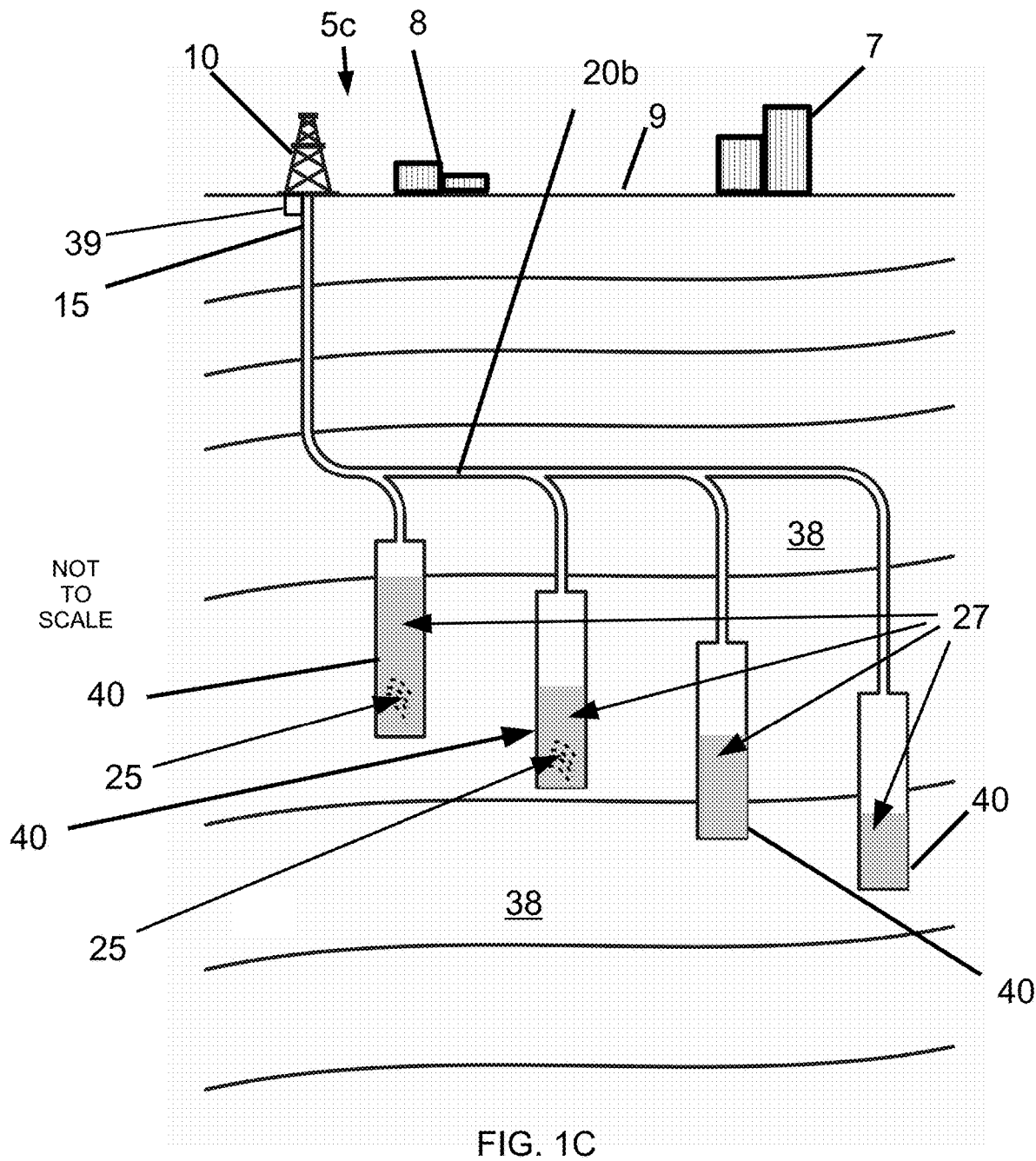
FIG. 1C shows a generalized cross-sectional diagram view of a waste system, comprising a plurality of human-made caverns located at least partially within a deep geological formation, wherein each human-made cavern may be configured for receiving waste capsules; and a system of wellbores running/connecting the plurality of human-made caverns to the Earth's surface.

FIG. 1C may be similar to the embodiments shown in FIG. 1A and/or FIG. 1B, but in FIG. 1C, the at least one wellbore may link Earth's surface 9 to a plurality of human-made caverns 40. In some embodiments, this waste disposal wellbore and human-made cavern system 5c may comprise the plurality of human-made caverns 40 and the at least one wellbore that connects the surface (Earth's surface 9) to this plurality of human-made cavern 40, wherein the plurality of human-made caverns 40 may be located within deep-geological-formation 38, and wherein the plurality of human-made caverns 40 may be configured for receive/house waste, such as waste capsules 25 with the waste. In some embodiments, each or at least one human-made cavern 40 in system 5c, may comprise at least one secondary support or intercept wellbore 15b.

Figure 1D:
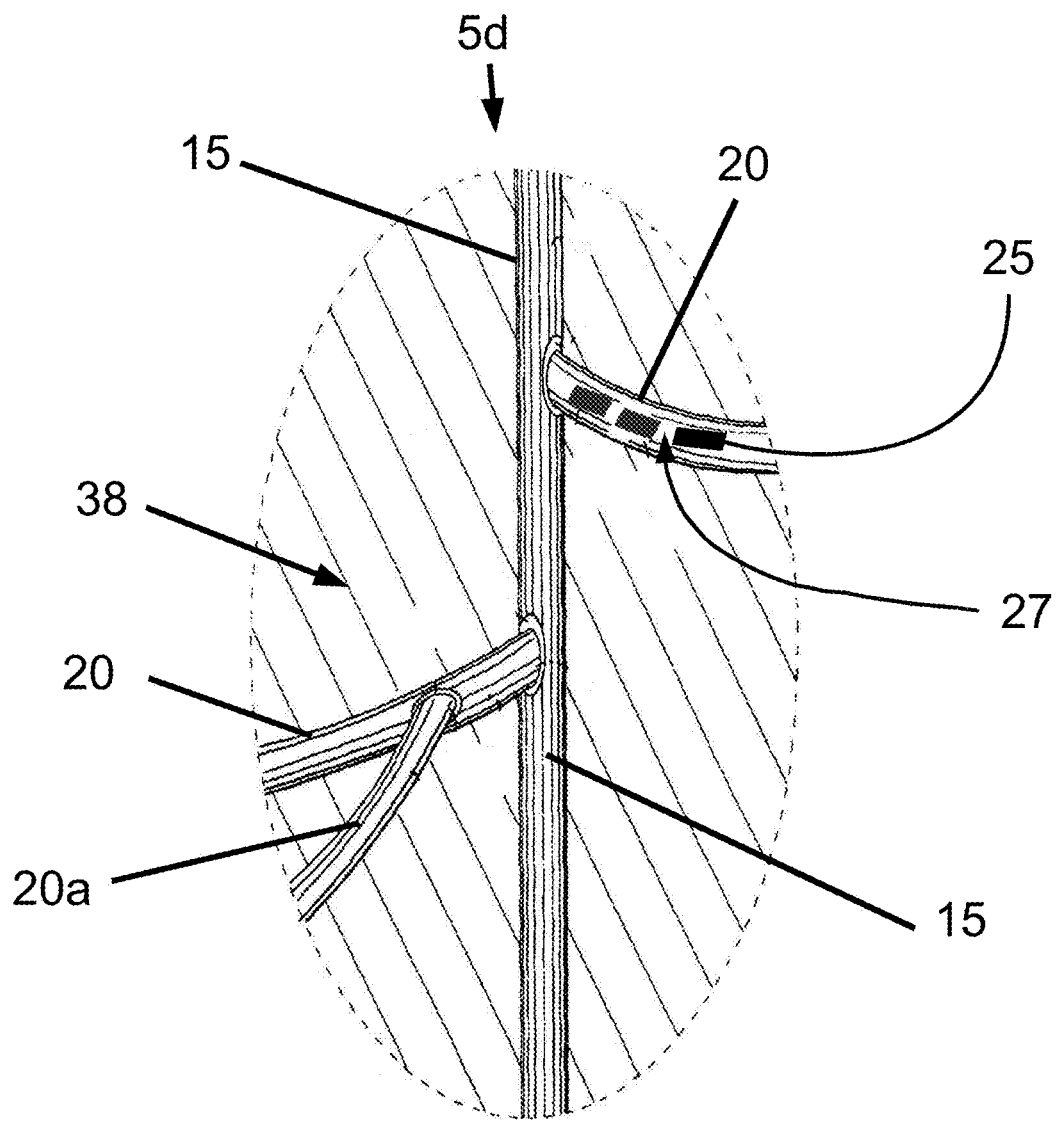
FIG. 1D shows a generalized perspective diagram view of a wellbore system, located at least partially within a deep geological formation, showing portions of vertical wellbores, portions of primary lateral wellbores, and a portion of a secondary lateral wellbore emanating from one of the primary lateral wellbores; and with some waste capsules located therein.

FIG. 1D may illustrate an inclusive overview of a portion of a waste disposal wellbore system 5d. In some embodiments, this waste disposal wellbore system 5d may comprise at least one wellbore located within a portion of deep-geological-formation 38, wherein that at least one wellbore may be configured to receive at least one waste capsule 25, wherein that at least one waste capsule 25 houses some waste. In some embodiments, this waste disposal wellbore system 5d may also comprise the at least one waste capsule 25. In some embodiments, the at least one wellbore may comprise a vertical wellbore 15, which may be drilled from the surface (e.g., Earth's surface 9 shown in FIGS. 1A and 1n FIG. 1B) to a depth substantially between 5,000 and 30,000 feet from the surface (Earth's surface 9). In some embodiments, this waste disposal wellbore system 5d may also comprise vertical wellbore 15. In some embodiments, vertical wellbore 15 may be accessed from the surface via a wellhead 15a (see e.g., FIG. 6 for wellhead 15a). In some embodiments, this waste disposal wellbore system 5d may also comprise wellhead 15a. In some embodiments, vertical wellbore 15 may be substantially vertical, i.e., substantially parallel with a vector of the Earth's gravitational field. Emanating from this primary vertical wellbore 15 may be a plurality of primary lateral wellbores 20 which are disposed at different azimuth angles around the initial vertical wellbore 15. In some embodiments, at least one of the plurality of primary lateral wellbores 20 may be substantially horizontal, i.e., substantially orthogonal with a vector of the Earth's gravitational field. In some embodiments, at least one of the plurality of primary lateral wellbores 20 may be substantially orthogonal with respect to primary vertical wellbore 15. In some embodiments, this waste disposal wellbore system 5d may also comprise at least one primary lateral wellbore 20. In some embodiments, this waste disposal wellbore system 5d may also comprise the plurality of primary lateral wellbores 20. In some embodiments, at least one secondary lateral wellbore 20a may be drilled from a given primary lateral wellbore 20. In some embodiments, this waste disposal wellbore system 5d may also comprise at least one secondary lateral wellbore 20a. In some embodiments, a surface drilling-rig 10 (see e.g., FIG. 1A and/or FIG. 1B) may be an apparatus that drills vertical-wellbore 15, primary lateral wellbore(s) 20, and/or secondary lateral wellbore(s) 20a; and into which the waste-capsule(s) 25 may be disposed into within a given portion of deep geological formation 38. In some embodiments, this waste disposal wellbore system 5d may also comprise at least one surface drilling-rig 10. In some embodiments, at least some of the wellbores (e.g., at least some of vertical-wellbore 15, primary lateral wellbore(s) 20, and/or secondary lateral wellbore(s) 20a) are located within a given portion of deep geological formation 38.

Continuing discussing FIG. 1D, in some embodiments, deep-geological-formation 38 may be located substantially from about 5,000 feet to about 30,000 feet below the Earth's surface 9, plus or minus 1,000 feet. In some embodiments, deep-geological-formation 38 may have geologic properties that make storing waste materials relatively safe and/or desirable. For example, and without limiting the scope of the present invention, in some embodiments, deep-geological-formation 38 may have one or more of the following geologic properties: structural closure, stratigraphically varied, low porosity, low permeability, low water saturation, reasonable clay content, combinations thereof, and/or the like. For example, and without limiting the scope of the present invention, in some embodiments, primary lateral wellbore(s) 20 may be located at a pre-determined depth of at least 10,000 feet below the surface (Earth's surface 9).

Continuing discussing FIG. 1D, in some embodiments, at least one waste-capsule 25 may store (e.g., contain/house) at least some waste. In some embodiments, waste-capsule(s) 25 may store (e.g., contain/house) hazardous waste; dangerous waste; radioactive waste; nuclear waste; HLW (high-level solid waste); SNF (spent nuclear fuel); depleted uranium products; depleted uranium penetrators; processed solid or semi solid waste from radioactive waste disposal systems like Hanford (USA); a variety of solid, vitreous, pelletized powdered, suspensions, and other waste-forms; combinations thereof, and/or the like. In some embodiments, waste-capsule(s) 25 may store (e.g., contain/house) waste that could be potentially unsafe if stored long term on the surface (Earth's surface 9), near human habitations, near human activity, near water sources, near surface ecosphere(s), combinations thereof, and/or the like.

In some embodiments, drilling-rig 10 may be a typical drilling rig as used in the oil-well drilling industry but with several updated modifications and features to allow safe handling of the radioactive/nuclear waste (such as HLW and/or SNF). See also FIG. 6 and its discussion below.

In some embodiments, at least some differences between systems 5a, 5b, 5c, and 5d may be: (1) system 5a (see e.g., FIG. 1A) may comprise at least one human-made cavern 40; (2) system 5b (see e.g., FIG. 1B) may comprise at least one secondary support or intercept wellbore 15b; (3) system 5c (see e.g., FIG. 1C) may comprise a plurality of human-made caverns 40; and (4) system 5d (see e.g., FIG. 1D) may not comprise any human-made caverns 40.

In some embodiments, systems 5a, 5b, 5c, and 5d may comprise one or more of: at least one wellbore (vertical wellbore 15, primary lateral wellbore 20, secondary lateral wellbore 20a, and/or S-shaped wellbore section 20b); casing 32; waste capsule 25; waste 24; wellhead 15a; drilling rig 10; drill rig floor 10a; remote waste storage 7; wellsite waste storage 8; wellbore viscous fluid 27; injected sealing fluid 27a; automatic robotic system 28; capsule counter system 39. Discussions of wellbores and/or their sections/segments, may be applicable systems 5a, 5b, 5c, and/or 5d.

In some embodiments, at least some portion of systems 5a, 5b, 5c, and 5d may be located entirely within a given deep geological formation 38.

Figure 2A:
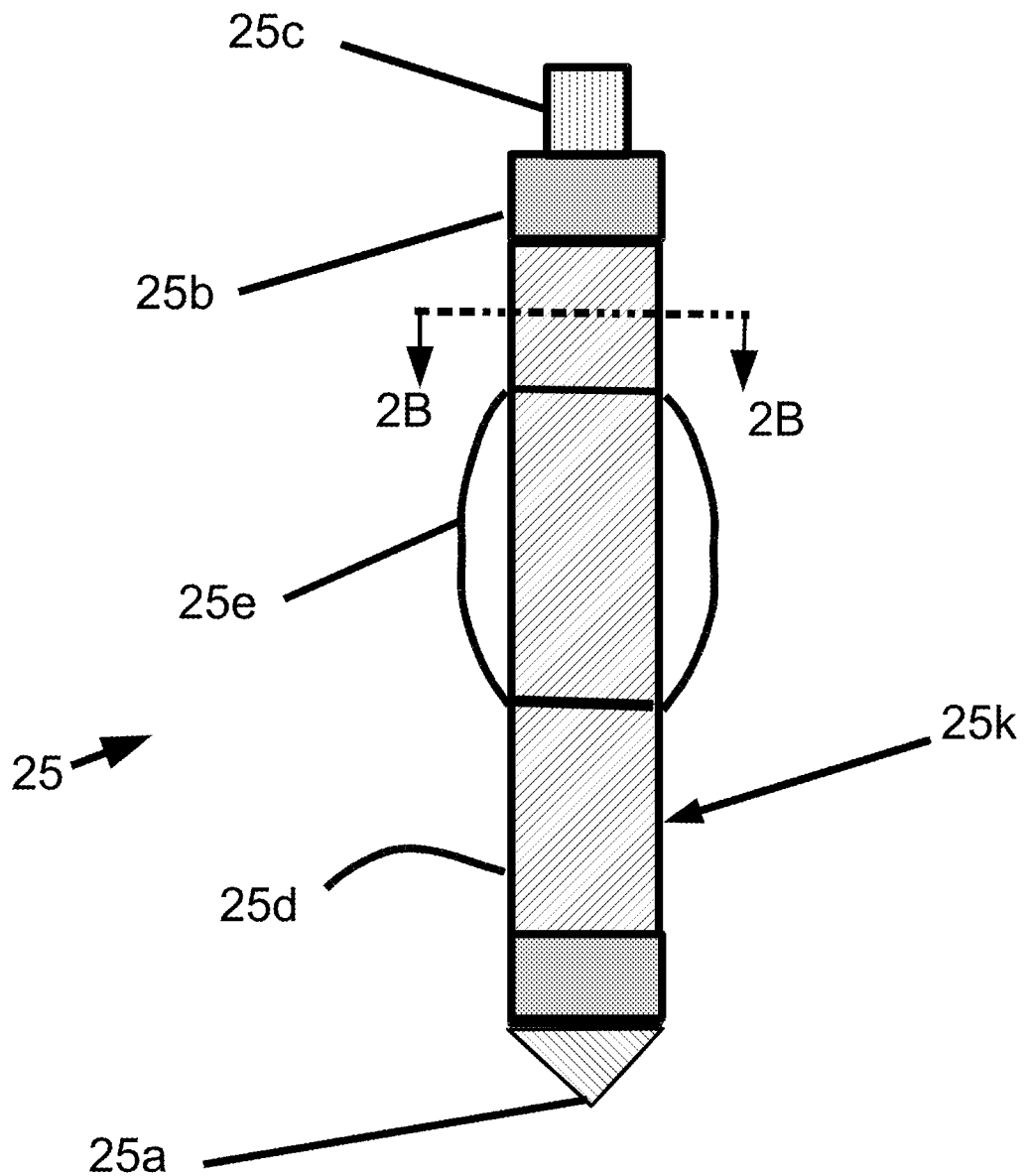
FIG. 2A shows a block diagram side view of a generalized waste capsule.

FIG. 2A may be a block diagram illustrating construction and/or elements of a given waste capsule 25. In some embodiments, a given waste capsule 25 may comprise a capsule body 25k. In some embodiments, this capsule body 25k may be a main carrier/housing of the waste material which is to be disposed of in the geological formation 38. In some embodiments, capsule body 25k may be a substantially cylindrical elongate member. In some embodiments, capsule body 25k may be substantially hollow, wherein this hollow space may be configured for receiving waste (see e.g., FIG. 2B). In some embodiments, capsule body 25k may be a steel casing 25d. In some embodiments, capsule body 25k may be substantially constructed from steel casing 25d. In some embodiments, the capsule body 25k may be constructed of a very durable material, such as a metal, metal alloys, like a metal, a non-ferrous composite or a combination of durable and long lived materials. In some embodiments, the capsule body 25k may be constructed of a generally robust non-durable or "disposable" material which would still allow safe deployment of the waste (which may be inside of capsule body 25k) and be deployable under the field operating conditions. In some embodiments, a given waste capsule 25 may be considered temporary packaging of/for the waste, with the given waste capsule 25 only needing to remain structurally intact until disposed of in the primary long-term protective mechanism of the given deep geological rock formation(s) 38, not the mechanical package itself of the given waste capsule 25.

Continuing discussing FIG. 2A, in some embodiments, a shape and physical geometry of a given waste capsule 25 may be determined by engineering, analytical simulations, computations, combinations thereof, and/or the like, to optimize the shape and behavior of the given waste capsule 25 as it falls down a wellbore contemplated herein and through wellbore viscous fluid 27. In some embodiments, such engineering, analytical simulations, computations, combinations thereof, and/or the like may result in a given waste capsule 25 being substantially streamlined with respect to wellbore viscous fluid 27.

Continuing discussing FIG. 2A, in some embodiments, the substantially elongate cylindrical member of capsule body 25k may be bound at one end, its nose, by a leading edge 25a, and capsule body 25k may be bound at its opposite end by a tail, or trailing edge (e.g., rear connector 25c). In some embodiments, a given waste capsule 25 may comprise a nose (leading edge 25a), capsuled body 25k, and a tail (trailing edge). In some embodiments, the nose may lead into capsule body 25k, and then capsule body 25k may terminate at the tail (trailing edge). In some embodiments, the nose may be conical, pointed, rounded, domed, and/or generally streamlined with respect to wellbore viscous fluid 27. In some embodiments, the nose (leading edge 25a) may be the front end of a given waste capsule 25; whereas, the tail (trailing edge) may be the rear/back of given waste capsule 25. In some embodiments, a given waste capsule 25 may have a generally streamlined body that allows for/facilitates/promotes/encourages fluid flow around its nose (leading edge 25a) and its sides of the capsule body 25k as the given waste capsule 25 moves down at least one of the wellbores contemplated herein (e.g., vertical wellbore 15, primary lateral wellbore 20, secondary lateral wellbore 20a, and/or S-shaped wellbore section 20b) and through the wellbore viscous fluid 27.

Continuing discussing FIG. 2A, in some embodiments, leading edge 25a may comprise a connector and the tail/trailing edge may comprise a rear connector 25c. In some embodiments, with respect to a single waste capsule 25, the leading edge 25a connector may be disposed opposite of the rear connector 25c. In some embodiments, a leading edge 25a connector of one waste capsule 25 may be configured to attached to the rear connector 25c of a different waste capsule 25. In some embodiments, a falling velocity of one waste capsule 25 may provide sufficient energy for the leading edge 25a connector of that falling waste capsule 25 to be attached to the rear connector 25c of a different waste capsule 25 located downstream of the falling waste capsule 25. In this manner, a string of self-connected waste capsules 25 may be formed within a given wellbore contemplated herein, wherein such a string may be comprised of a plurality of waste capsules 25 connected serially, end to end (see e.g., FIG. 2D). In some embodiments, in the self-loading process, the lower waste capsule's 25 rear connector 25c may slide open during the collision contact with the leading edge 25a of the upper waste capsule 25 to form a self-coupling system 25l. Such self-connecting may be similar to how a series of railcars "self-connect" using a self-coupling system used during coupling to automatically make up a full train.

Continuing discussing FIG. 2A, in some embodiments, leading edge 25a may comprise a crash impact attenuator. In some embodiments, leading edge 25a may be configured to function as a crash impact attenuator. In some embodiments, crash impact attenuator may protect that waste capsule 25 from undesired impacts. In some embodiments, leading edge 25a may comprise one or more of: crumble/crush zones, springs, shock absorbers, foam, combinations thereof, and/or the like, that may function as the crash impact attenuator.

Continuing discussing FIG. 2A, in some embodiments, the tail (e.g., trailing end) of a given waste capsule 25 may comprise one or more stabilizers 25b. In some embodiments, a given stabilizer 25b may be configured to provide motion stability and/or to limit oscillations of/to the given waste capsule 25 during falling of that given waste capsule 25 in the given wellbore and through the wellbore viscous fluid 27. See also FIG. 2C regarding types of stabilizers for a given waste capsule 25.

Continuing discussing FIG. 2A, in some embodiments, rear connector 25c may have multiple features. In some embodiments, the rear connector 25c may have a "fishing head" which allows the given waste capsule 25 to be grabbed by a fishing tool from Earth's surface 9 (wellhead 15a) and retrieved from the wellbore(s), if needed/desired.

Continuing discussing FIG. 2A, in some embodiments, a given waste capsule 25 may comprise one or more centralizers 25e disposed on the outside of the capsule body 25k. In some embodiments, these centralizers 25e allow the waste capsule 25 to "stand off" from the wellbores interior surfaces (and/or from the wellbores casing interior surfaces). In some embodiments, an outside diameter of a given waste capsule 25 (e.g., at capsule body 25k) may be fixed and predetermined. In some embodiments, an outside diameter of a given waste capsule 25 (e.g., at capsule body 25k) may be fixed, and may be from 4 inches to 24 inches, plus or minus 2 inches. In other embodiments, the outside diameter of the given waste capsule 25 (e.g., at capsule body 25k) may be another fixed and predetermined dimension. In some embodiments, the outside diameter of the given waste capsule 25 (e.g., at capsule body 25k) may be governed/limited by: wellbore and/or wellbore casing inside diameters; and/or by the quantity and/or the density of the waste material being disposed of. For example, and without limiting the scope of the present invention, larger outside diameter waste capsules 25 may be necessary/desired for wastes of lower density, which are being disposed of in generally shallower wellbore of cavern systems.

Figure 2B:
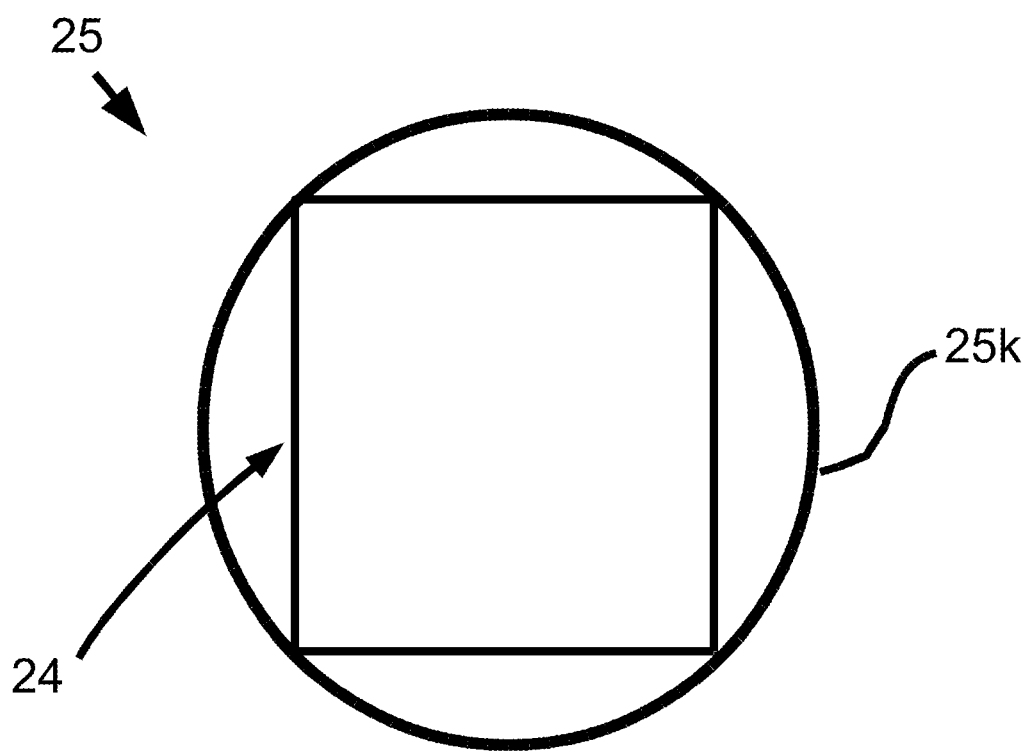
FIG. 2B shows a generalized cross-section through a diameter of a given waste capsule.

FIG. 2B shows a generalized cross-section through a diameter of a given waste capsule 25. In some embodiments, hollow volume/space within a given waste capsule 25 may be configured for housing waste 24. In some embodiments, the waste 24 within a given waste capsule 25 may be amorphous; or may have a predetermined shape and/or a predetermined configuration.

Figure 2C:
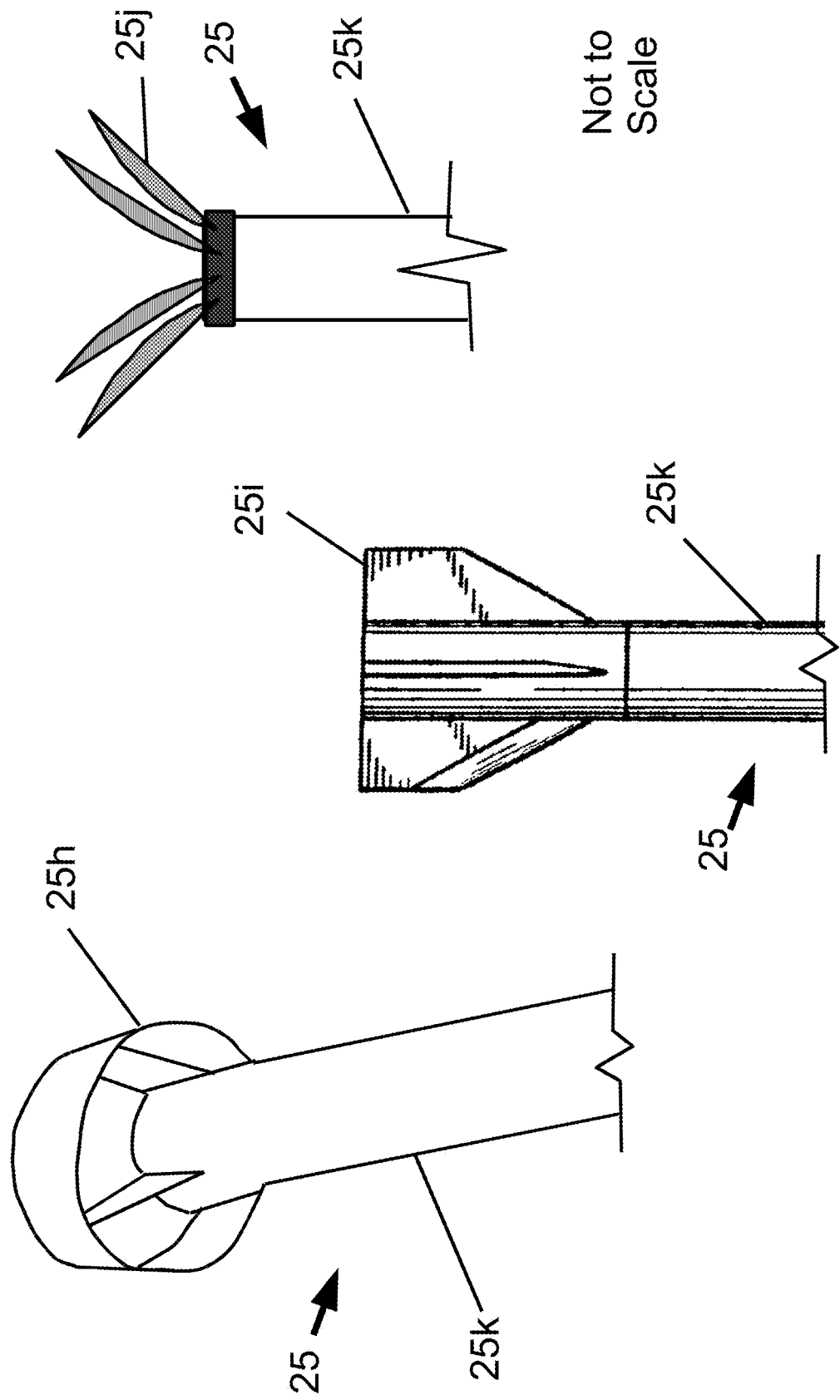
FIG. 2C shows three block diagram view examples of three tail portions of waste capsules that may implement various stabilizers (e.g., internal and/or external fins) and/or drag vanes of the waste capsules.

FIG. 2C may illustrate three block diagram view examples of three tail portions of waste capsules 25 that may implement various stabilizers 25b (e.g., internal fins 25h and/or external fins 25i) and/or drag vanes 25j of the given waste capsule 25. In some embodiments, the tail portion (trailing edge portion) of a given waste capsule 25 may comprise one or more: stabilizers 25b, internal stabilizer fins 25h, external stabilizer fins 25i, drag vanes 25j, combinations thereof, and/or the like. FIG. 2C may illustrate the types of the stabilizer system 25b that may be implemented on a given waste capsule 25. In some embodiments, stability may be incurred by either of two methods. For example, and without limiting the scope of the present invention, one may "fin it" or "spin it," to accomplish stable motion of the given capsule 25 within a given wellbore and falling through the wellbore viscous fluid 27. In some embodiments, in finning a given waste capsule 25, a plurality of external fins 25i may be implemented at or near the rear end of that given waste capsule 25. In some embodiments, a given external fin 25i may extend orthogonally away from a main longitude of that given waste capsule 25. In some embodiments, in finning a given waste capsule 25, internal fin system 25h may be implemented at or near the rear end of that given waste capsule 25. In some embodiments, a given waste capsule 25 may have drag vanes 25j implemented at or near the rear end of that given waste capsule 25. Such stabilizers may be well known in the arts of aerodynamics and/or with respect to submersibles (e.g., submarines and/or torpedoes); however, those teachings may need to be modified to applied to the inventions/embodiments contemplated herein, wherein it may be desired to control the velocity and/or the location of the given waste capsule 25 that may be falling within a given wellbore and within the wellbore viscous fluid 27. In some embodiments, the trailing end of the waste capsule 25 may be modified such that rear connectors 25c may be implemented on the waste capsule 25 as needed/desired.

Figure 2D:
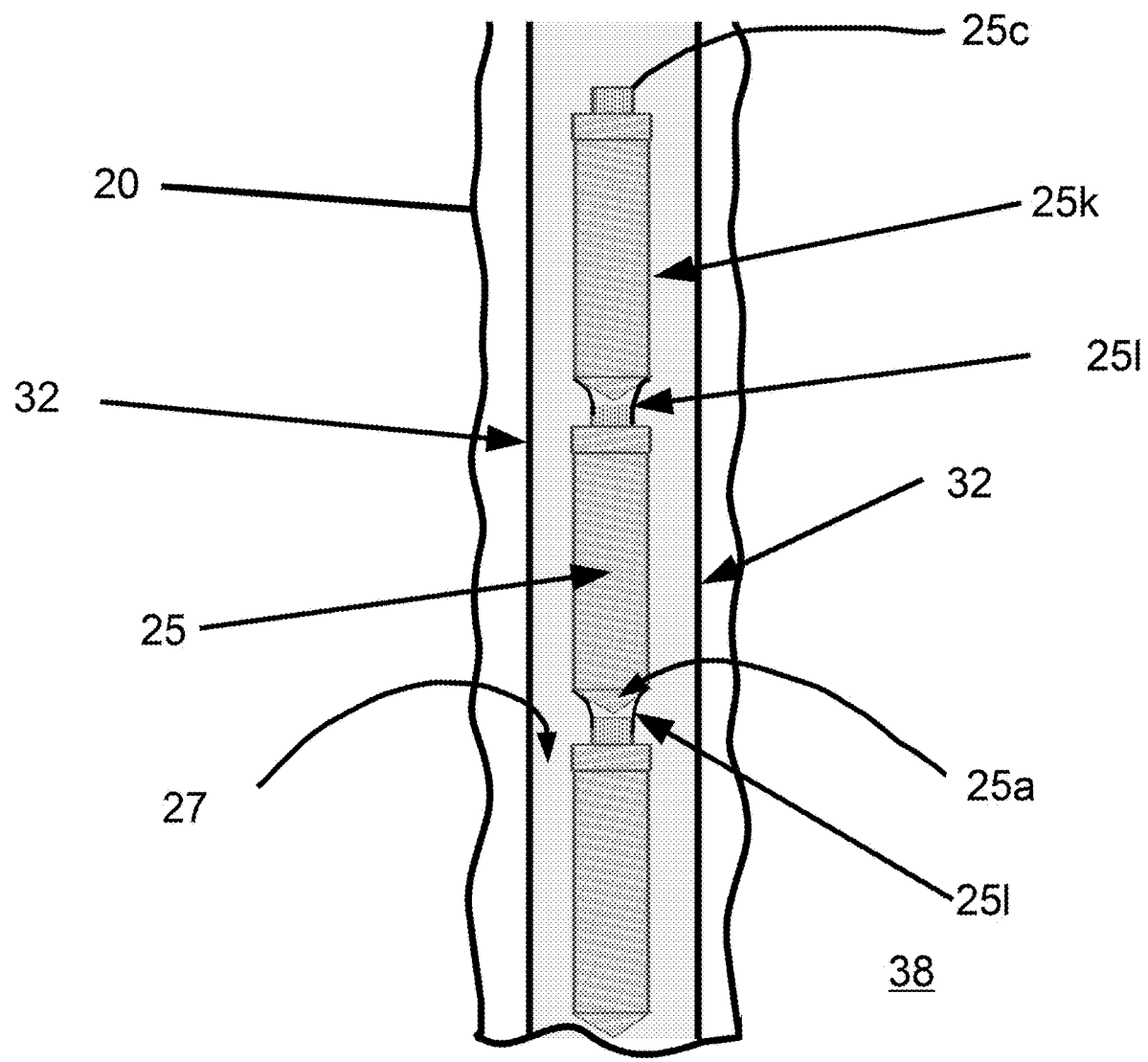
FIG. 2D shows a generalized cross-sectional diagram view of several waste capsules that are connected together, end to end, after they have been self-loaded into the wellbore from the surface and the self-locking connectors between the sequential waste capsules are activated on contact between adjacent waste capsules.

FIG. 2D may illustrate a generalized cross-sectional diagram view in which several waste capsules 25 that are connected together, serially end to end, after they have been self-loaded into a given wellbore from Earth's surface 9 and the self-locking connections 251 between the serially adjacent/sequential waste capsules 25 are triggered on contact between adjacent waste capsules 25. The self-locking connection 251 occurs on contact between two waste capsules 25 when the leading edge 25a of the upper (backward) waste capsule 25 is brought to a stop on contact with the trailing edge rear connector 25c of the forward waste capsule 25. In this manner several (a plurality) waste capsules 25 may be linked up, end to end, to form a waste disposal assembly in the given wellbore(s).

Figure 3:
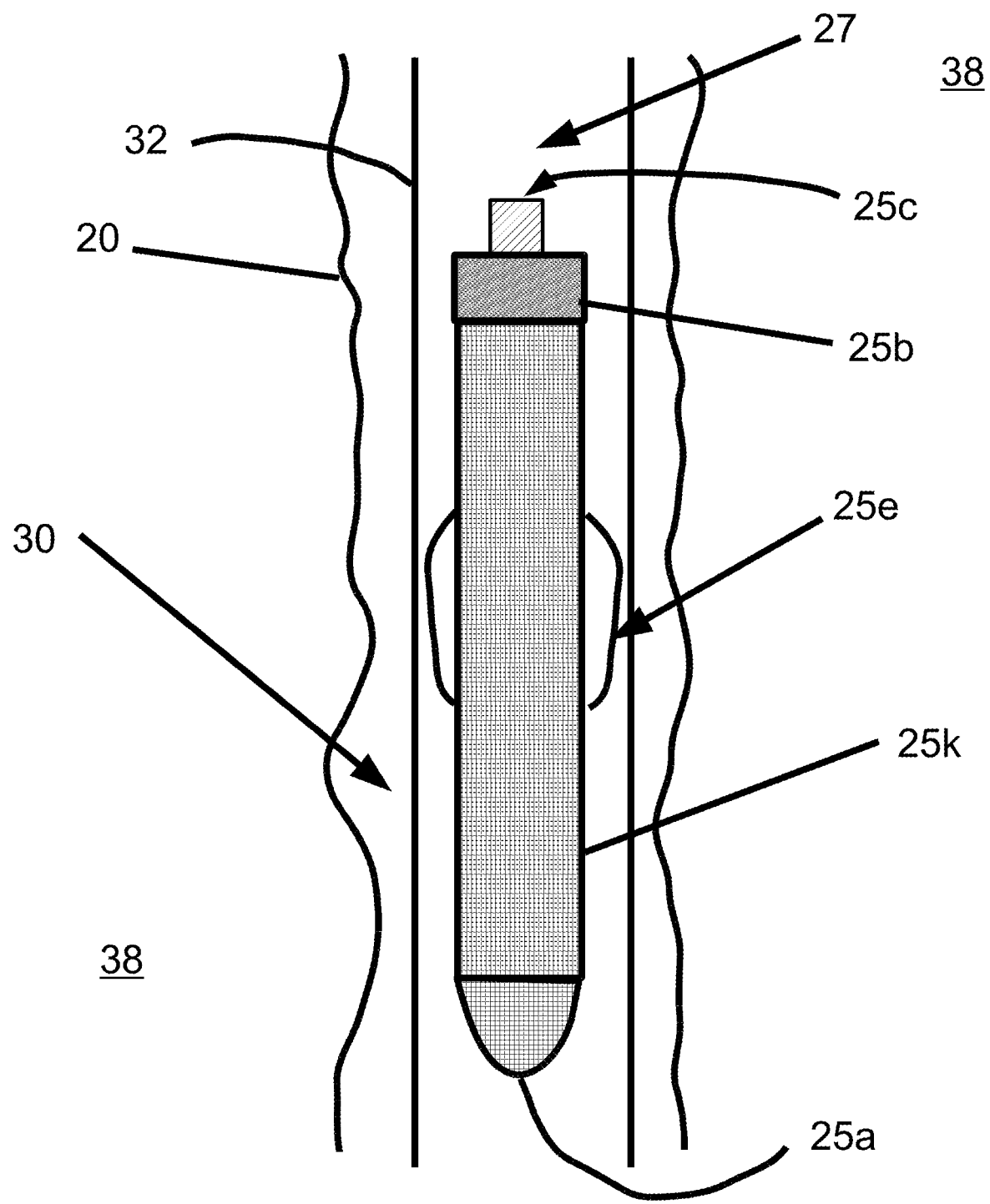
FIG. 3 shows block diagram cross-sectional view of a generalized waste capsule disposed of and falling in a portion of a wellbore.

FIG. 3 may illustrate an inclusive overview showing a cross-section of a given wellbore system and a waste capsule 25 disposed of and falling inside of that portion of wellbore. In addition, FIG. 3 shows the wellbore section with a protective annular cement sheath 30 between some surfaces of the deep geologic formation 38 and a casing 32; that is, at least portions of the interior surfaces of the wellbore, that are surfaces of deep geologic formation 38, may be cased with casing 32, and in between casing 32 and these surfaces of deep geologic formation 38 may be an annular ring that may be filled with cement 30. In some embodiments, casing 32 may be pipe(s) and/or piping. In some embodiments, casing 32 may be steel pipe(s) and/or steel piping. In some embodiments, disposed inside of casing 32 (and/or the wellbore sections in some embodiments) may be wellbore viscous fluid 27. In some embodiments, this wellbore viscous fluid 27 may have a known and predetermined viscosity that man be modified and made such that the wellbore viscous fluid 27 properties allow/help/assist/facilitate/promote the given waste capsule 25 to slow down its settling velocity of the falling waste capsule 25 and allows a manageable terminal velocity 31 to be achieved of the given waste capsule 25 while it is falling in a given section of wellbore/casing 32. In some embodiments, the given waste capsule 25 may be sized to allow an acceptable space for the wellbore viscous fluid 27 to flow past and around the exterior of the given falling waste capsule 25. In some embodiments, the given waste capsule 25 may comprise leading edge 25a and trailing edge 25b, wherein leading edge 25a and trailing edge 25b may be disposed opposite from each other.

Figure 4:
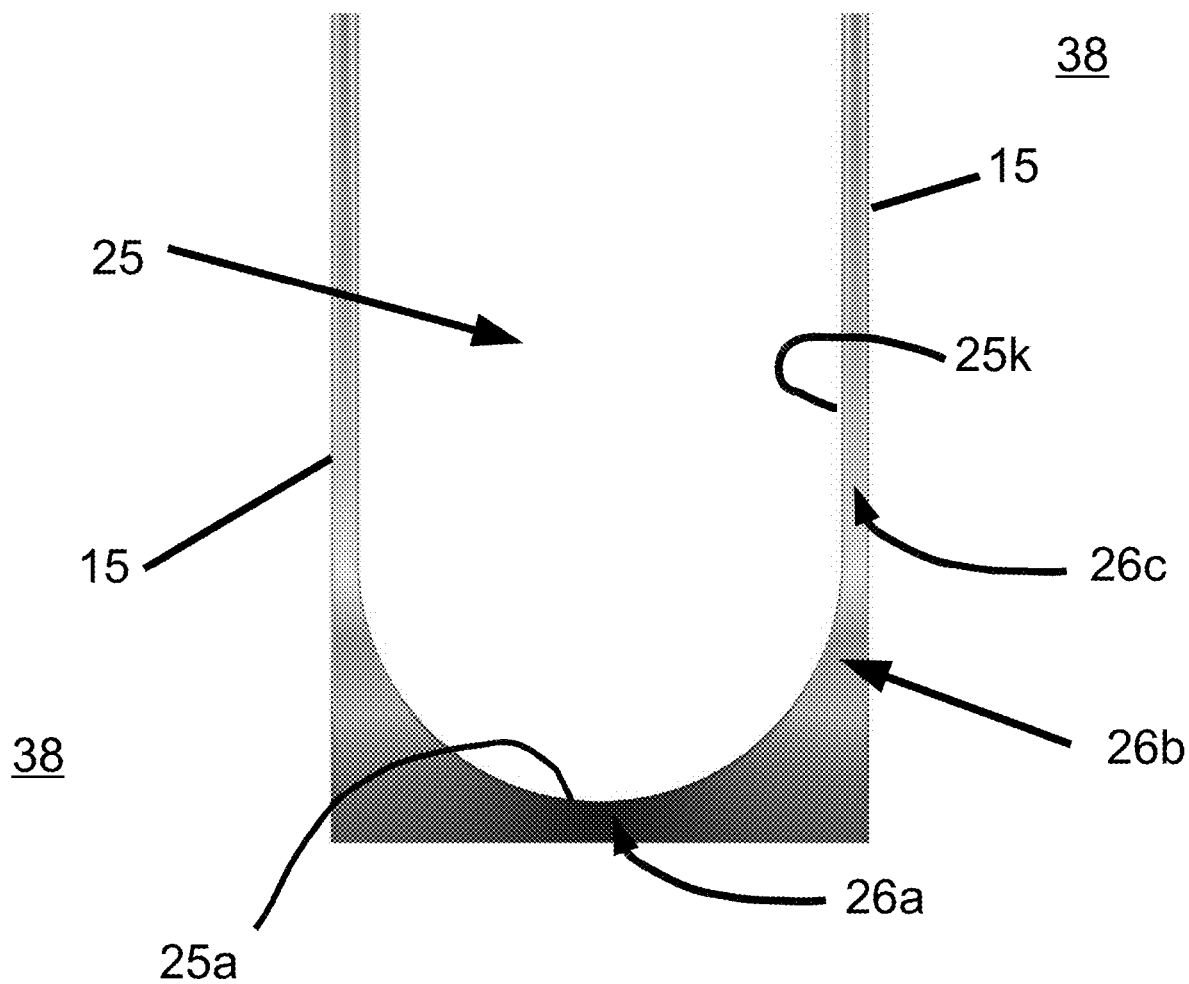
FIG. 4 illustrates a cross-section of a velocity profile distribution around a generalized waste capsule falling through a viscosity-controlled fluid medium.

FIG. 4 may illustrate a conceptual view showing a cross-section of a portion of a given wellbore, showing a portion of a given wellbore section and showing a portion of a given waste capsule 25 disposed of inside and falling within that given wellbore section, wherein that given wellbore section may be drilled and/or located within deep geological formation 38. In addition, FIG. 4 shows a velocity profile of the wellbore viscous fluid 27 as it moves around that falling waste capsule 25 and between the waste capsule 25 exterior surfaces and interior surfaces of that given wellbore section (in some embodiments, the interior surfaces may be inside surfaces of casing 32 and/or of deep geological formation 38). In some embodiments, at a tip/apex of leading edge 25a of waste capsule 25 there may be a nearly stagnant region or zone 26a. In some embodiments, towards where leading edge 25a transitions into an exterior side wall of the given waste capsule 25 (e.g., at an exterior of capsule body 25k) and proximate to a nearest inside/interior surface of the wellbore section there is a region of increasing velocity of the wellbore viscous fluid 27, denoted in FIG. 4 as increasing velocity region 26b. At the narrowest section of the annular region between the capsule 25 and that wellbore section, the wellbore viscous fluid velocity may be at its greatest, denoted in FIG. 4 as high-velocity region 26c. In some embodiments, this type of velocity profile shown in FIG. 4 may be routinely modeled and/or calculated today using finite element analysis models and/or computational fluid dynamics. These models may include physical geometry properties of a given waste capsule 25; and/or these models may include rheological properties of the wellbore viscous fluid 27; and/or these models may include physical properties of the wellbore sections/casings 32, such as wall roughness. By varying the definitive properties of the wellbore viscous fluid 27, an optimal computer model may be constructed which may be used by engineers to formulate an operations model that should make the waste capsules 25 settle at a rate which makes operational sense. By selecting the optimal properties which provide a critical terminal speed 31, the engineers may stage the dropping of the waste capsules 25 such that a near continuous stream of waste capsules 25 are deployed safely in the wellbore systems. As an example, if a critical time of deployment is calculated of 15 seconds is determined, the operator may automatically drop a waste capsule 25 every 15 seconds and the waste capsules 25 may follow each other down the wellbores in a stable sequence. In this manner several hundred waste capsules 25 may be deployed efficiently in a matter of hours.

Figure 5B:
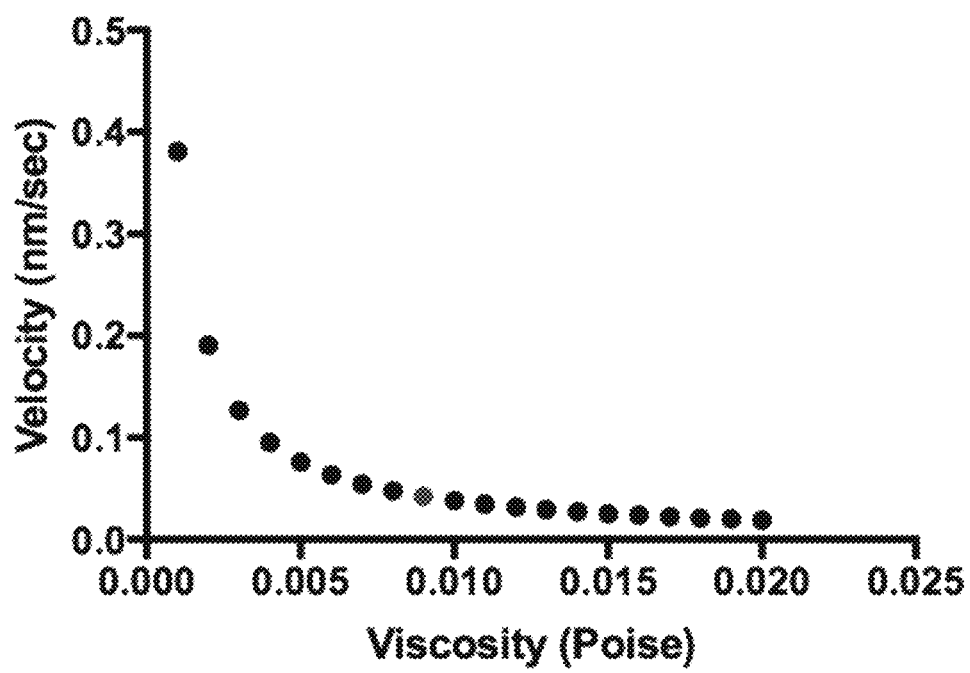
FIG. 5B illustrates graphically a variation of terminal velocity in fluid(s) of increasing viscosity.

FIG. 5A and FIG. 5B may graphically illustrate a concept of terminal velocity 31 which is important to at least some embodiments of this invention. Terminal velocity 31 occurs when the gravitational forces balance the frictional forces of a given fluid acting on the body in motion, i.e., when the falling body reaches its terminal velocity 31, that falling body then ceases to accelerate further (despite being under acceleration due to gravity) and may attain a relatively stable velocity. As shown in FIG. 5A a body reaches a terminal velocity 31 after a specified time of falling as a result of gravity in a given fluid. In FIG. 5B the effects of varying fluid viscosity on terminal velocity 31 is shown. FIG. 5B shows an inverse relationship between settling velocity and viscosity. This type of relationship provides an operational basis for selecting an optimal viscosity and a critical time interval for self-loading of waste capsules 25 in wellbores. These physics principals facilitate self-loading of waste capsules 25 in wellbores as taught herein.

In this patent application, the inventors may predetermine a given terminal velocity 31 to be utilized and/or targeted, by manipulating the physical geometry of the waste capsules 25; and/or the fluid characteristics of the wellbore viscous fluid 27; and/or surface properties of the interior/inside surfaces of the wellbore/casing 32. In some embodiments, this terminal velocity 31 may be optimized such that a suitable and adequate critical time interval between dropping of the waste capsules 25 may be determined and utilized with ease, thus providing for smooth and safe field operations at the disposal well site.

Figure 6:
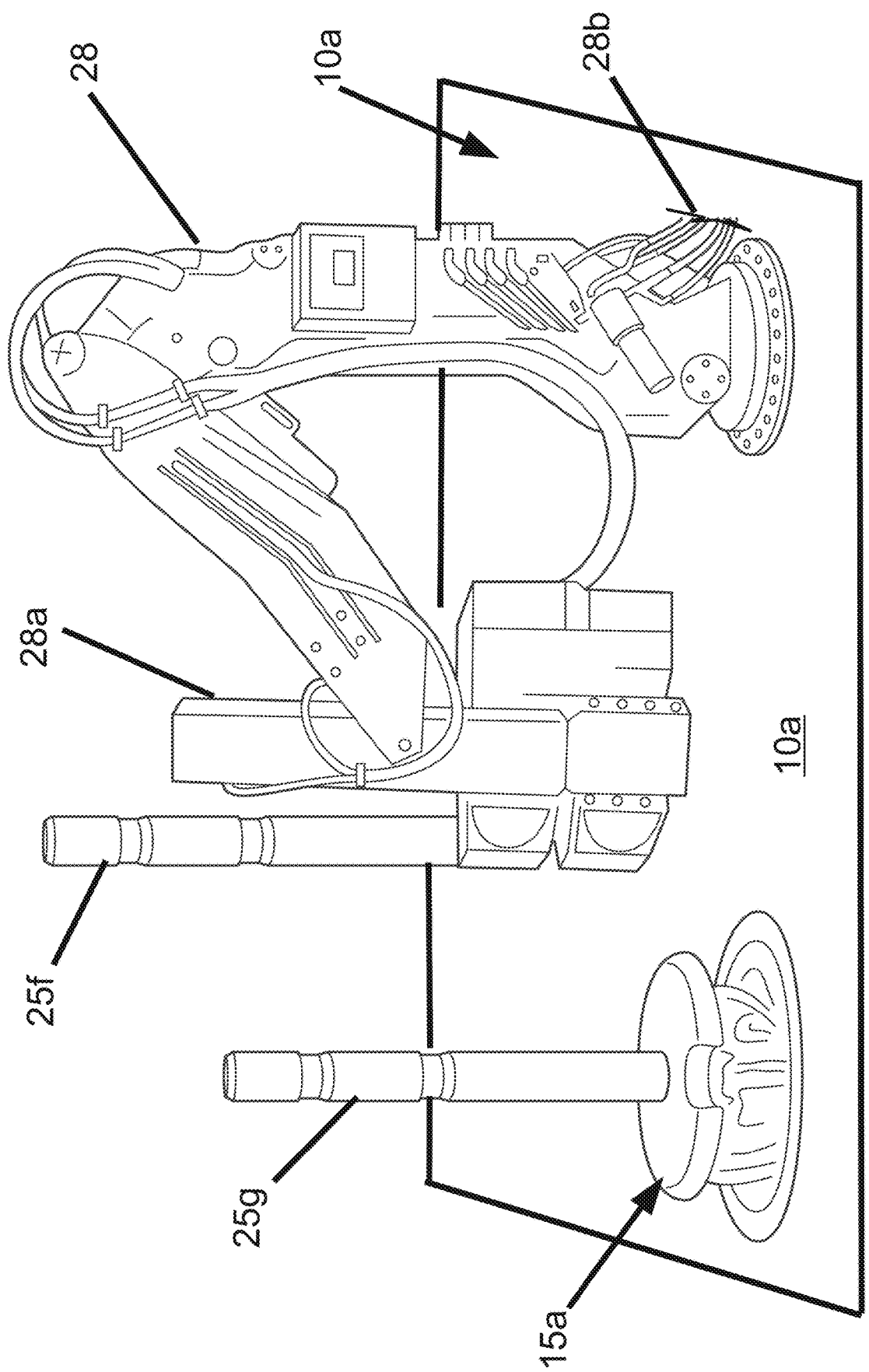
FIG. 6 shows a perspective view of a portion of a generalized drill rig floor showing some surface operations of embodiments of the invention.

FIG. 6 shows a perspective view of a portion of a generalized drill rig floor 10a showing some surface operations of embodiments of the invention. FIG. 6 may show a robotic system and a waste capsule 25 being loaded into a wellbore wellhead 15a at the surface using the robotic system. FIG. 6 may illustrate at least some processes and equipment for the disposal of waste capsules 25 involved in the self-loading surface operations which occur on the drill rig floor 10a of the drill rig 10. In some embodiments, this subject patent application may teach the use of an automatic robotic system 28, such that the waste material is safely handled (in some embodiments/applications, the waste may be radioactive, dangerous, hazardous, and/or the like). It is contemplated that adequate safety shielding using recommended shielding material and/or shielding equipment may be implemented on/at the rig floor area 10a for personnel safety. Shielding may include partitions and enclosures, constructed of dense materials (e.g., substantially constructed of lead), to minimize exposure and/or contamination. In some embodiments, radiation protection may not be required/needed after the waste capsules 25 are inserted into the wellbore and are at least several feet below Earth's surface 9 level (i.e., at least several feet below wellhead 15a).

Continuing discussing FIG. 6, in some embodiments, automatic robotic system 28 may be configured for handling waste capsules 25. In some embodiments, automatic robotic system 28 may be configured for grabbing waste capsules 25. In some embodiments, automatic robotic system 28 may be configured for inserting/dropping waste capsules 25 into wellhead 15a. In some embodiments, automatic robotic system 28 may be located on a portion of drill rig floor 10a. In some embodiments, automatic robotic system 28 may be located at or proximate to a portion of drill rig floor 10a. In some embodiments, automatic robotic system 28 may be attached (mounted) to a portion of drill rig floor 10a. In some embodiments, drilling rig 10 may comprise automatic robotic system 28. In some embodiments, drill rig floor 10a may comprise automatic robotic system 28. In some embodiments, at least one of the systems contemplated herein may further comprise at least one automatic robotic system 28. In some embodiments, a given automatic robotic system 28 may comprise a robotic arm, that may terminate in a robotic clamp device 28a. In some embodiments, robotic clamp device 28a may be configured for repeatedly grabbing and releasing a single waste capsule 25 at a time. In some embodiments, automatic robotic system 28 may comprise communicative means 28b. In some embodiments, communicative means 28b may be an operative link to control architecture, wherein the control architecture may be used to control automatic robotic system 28. In some embodiments, communicative means 28b may operate via wired connection(s) to the control architecture and/or via wireless connection(s) to the control architecture. In some embodiments, the control architecture may be a computer, such as, but not limited to, a tablet computing device, a laptop computer, a smartphone, a server, a work station, a desk top computer, a tower computer, a microcomputer, a mainframe computer, combinations thereof, and/or the like. In some embodiments, communicative means 28b may comprise one or more: cables, wires, buses, antennas, combinations thereof, and/or the like. In some embodiments, automatic robotic system 28 may comprise one or more: robotic clamp device 28a; communicative means 28b; robotic arms; motors; gears; pulleys; levers; actuators; hydraulics; pistons; rams; axles; rods; struts; joints; hinges; springs; circuits; printed circuits; printed circuit boards (PCBs); controllers; programmable logic controllers (PLCs); processors; microprocessors; memory (for non-transitory storage of computer programs, software, firmware, and/or data); sensors; cameras; microphones; speakers; screens; keyboards; lights; alarms; inputs/outputs (I/O) means; power sources; combinations thereof, and/or the like. In some embodiments, automatic robotic system 28 may be a modified "iron roughneck."

Continuing discussing FIG. 6, in some embodiments, automatic robotic system 28 may be operated remotely via computerized controls and software. In some embodiments, this automatic robotic system 28 may be connected, via communicative means 28b, to an adjacent or a remote means, the control architecture, which may allow the robotic arm of the automatic robotic system 28 to function and provide for the selection, transport locally, and insertion/dropping of the waste capsule 25 into the wellhead 15a. In some embodiments, attached to and usually forming an integral part of the automatic robotic system 28, may be a securing system, i.e., robotic clamp device 28a, which may grab and hold (and release) a given waste capsule 25.

In FIG. 6, reference numeral 25f denotes a given waste capsule 25 being handled (e.g., grabbed) by the robotic clamp device 28a. In some embodiments, reference numeral 25f may show given waste capsule 25 being transported by the robotic clamp device 28a. Whereas, in FIG. 6, reference numeral 25g denotes a given waste capsule 25 having been released from the robotic clamp device 28a at/above the wellhead 15a, such that the now released capsule 25 may fall into the wellbore system located immediately below wellhead 15a, and such that this now released and falling waste capsule 25 may self-load itself into the given waste disposal system. In normal operations, the waste capsules 25, prior to insertion into wellhead 15a, may be stacked in a series of stacking equipment or means which are routinely available in the drilling industry for efficiently stacking tubular goods on the drill rig floor 10a of the drilling rig 10. In a series of repetitive/iterative operations, the automatic robotic system 28 selects, transports, and then loads the waste capsule 25 into the wellhead 15a, wherein the inserted given waste capsule 25 then falls (self-loads) into the wellbore system and the wellbore viscous fluid 27 within that wellbore system. In some embodiments, such a process may continue until a predetermined quantity of the waste capsules 25 are loaded into the waste repository system, for ultimate long-term storage/disposal in the subject deep geological formation 38.

Figure 7:
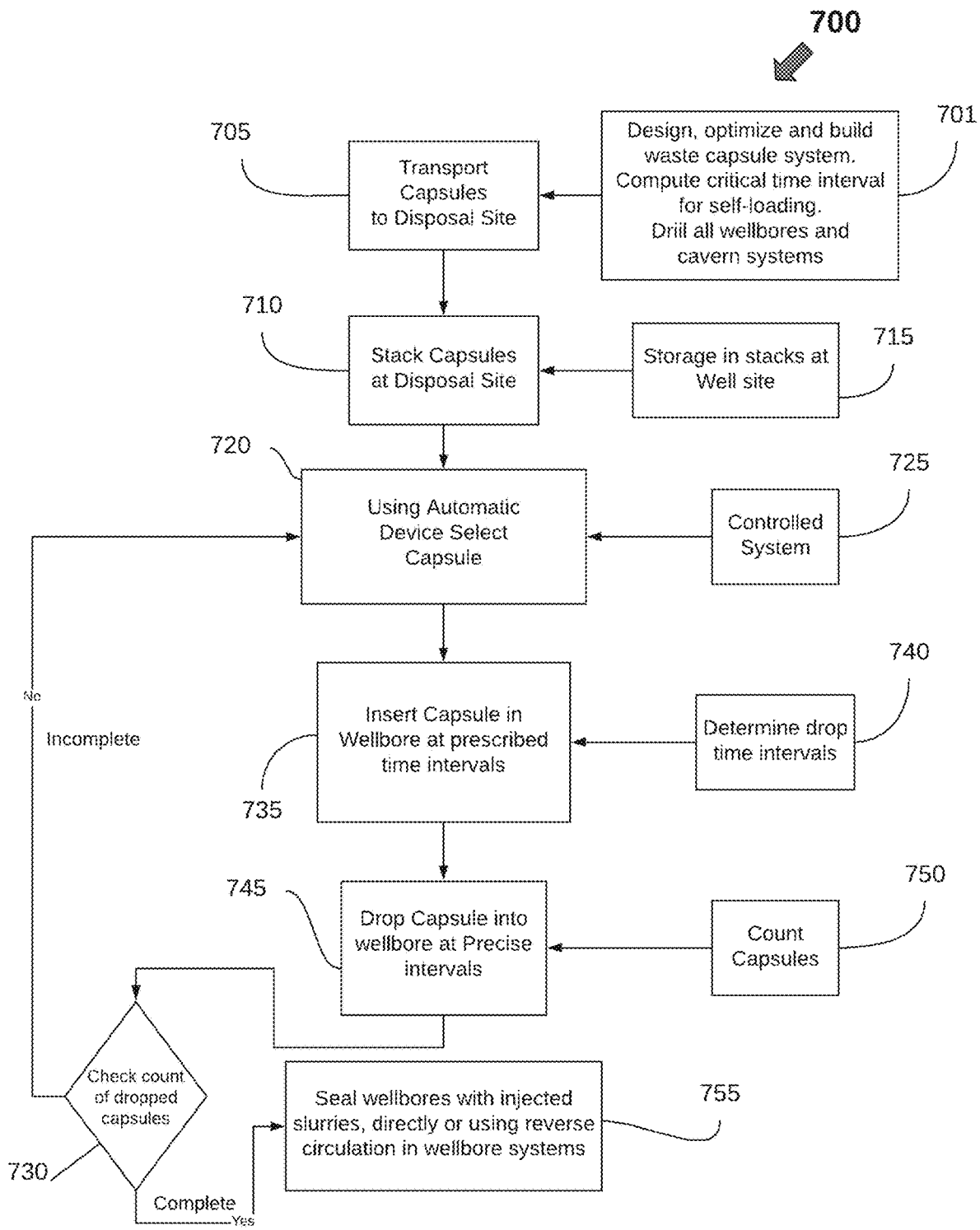
FIG. 7 may depict a flow chart which illustrates a method, with various steps, for handling loading of the waste material in a wellbore system connected to a deep geological formation.

FIG. 7 may depict a flowchart. FIG. 7 may depict various steps of a method 700. In some embodiments, method 700 may be a method for self-loading waste in deep geologic formation(s) 38. In some embodiments, method 700 may be a method for designing the waste capsules 25 and specific wellbore viscous fluid 27 to allow for efficient self-loading of waste capsules 25 in wellbore systems with the wellbore viscous fluid 27. In some embodiments, method 700 may comprise steps of designing, drilling, and completing the wellbores and/or the human-made cavern(s). In some embodiments, method 700 may comprise one or more of: step 701, step 705, step 710, step 715, step 720, step 725, step 730, step 735, step 740, step 745, step 750, and/or step 755.

Continuing discussing FIG. 7, in some embodiments, step 701 may be a step of designing, determining, optimizing, selecting, and/or constructing: the waste capsules 25; an optimal/desired viscosity and/or other fluid properties for wellbore viscous fluid 27; a critical time interval for self-loading the capsules 25 into the wellhead 15a; sizes (e.g., diameters and/or lengths) of the wellbores; wellbore casings 32, if any; sizes (e.g., diameters and/or lengths) and quantity of human-made caverns 40, if any; combinations thereof, and/or the like. In some embodiments, step 701 may be completed, or partially completed, before the wellsite is ready and prepared for operational disposal of the waste. In some embodiments, step 701 may involve the required drilling and completion operations to implement the wellbore systems and/or human-made cavern(s) 40. In some embodiments, a plurality of wellbores and/or a plurality (or at least one) human-made cavern(s) 40 may be disposed at/below the given Earth's surface 9 location. In some embodiments, this work may be implemented by independent drilling operators working under negotiated contracts for services. In some embodiments, step 701 may progress into step 705.

Continuing discussing FIG. 7, in some embodiments, step 705 may be a step of transporting a predetermined quantity of waste capsules 25 (with waste) to the disposal wellsite. In practice, this waste capsule 25 transport operation may be completed under the direction and supervision of federal, state, and/or local regulatory requirements. In some embodiments, step 705 may progress into step 710.

Continuing discussing FIG. 7, in some embodiments, step 701 may occur away from subterranean storage location site; i.e., away from below where deep-geological-formation 38 may be located. In some embodiments step 701 may occur at a facility remote from the well site location. In some embodiments, part of step 705 may occur away from subterranean storage location site; i.e., away from below where deep-geological-formation 38 may be located.

Continuing discussing FIG. 7, in some embodiments, step 710 may be a step of stacking the waste capsules 25 at the disposal wellsite. In some embodiments, it is contemplated that the waste capsules 25 are stored in well designed, well-protected facilities which provide for minimal exposure to radiation and/or dangerous effects of the waste. In some embodiments, this stacking process may be designed such that the ensuing operations of automatically selecting and loading the waste capsules 25 may be expedited and performed as easily and efficiently as possible. In some embodiments, step 710 may progress into step 720.

Continuing discussing FIG. 7, in some embodiments, step 715 may be a step of storing the waste capsules 25 in stacks at the disposal wellsite. In some embodiments, step 715 may progress into step 710. In some embodiments, step 715 and step 710 may occur concurrently. In the stacking and storage steps of step 710 and step 715, respectively, the waste capsules 25 may be optimally located and pre-positioned on the wellsite such that wellsite operations of selecting and loading the waste capsules 25 may be expedited and performed as easily and efficiently as possible. In some embodiments, the waste capsules 25 may be moved, stacked, and/or stored under protective conditions, at the disposal wellsite, such that any radioactive exposure/contamination is limited at the well site.

Continuing discussing FIG. 7, in some embodiments, step 720 may be a step of using automatic robotic system 28 to select, grab, and move/transport one or more capsules 25 from stacked/storage to the disposal wellhead 15a for insertion into the vertical wellbore 15. In some embodiments, in step 720 automatic robotic system 28, e.g., as shown in FIG. 6, may be used to select, move, transport, and position a given waste capsule 25 at wellhead 15a. In some embodiments, step 720 may be controlled and/or performed under the direction of a control system, e.g., the control architecture, as illustrated in step 725. In some embodiments, step 725 may be a step of controlling automatic robotic system 28. In some embodiments, step 725 may be a step of controlling automatic robotic system 28, with respect to step 720. In some embodiments, step 725 may progress into step 720. In some embodiments, step 725 may control step 720.

Continuing discussing of FIG. 7, in some embodiments, step 735 may be a step of inserting and/or dropping waste capsules 25 into wellhead 15a, into the initial (e.g., top most) vertical wellbore 15 section at prescribed time intervals. In some embodiments, step 735 may illustrate processes of placing/positioning one or more waste capsules 25 and inserting (and then dropping) such waste capsules 25 into the disposal wellhead 15a. In some embodiments, in this step 735, the actions of the automatic robotic system 28 may be orchestrated at known (e.g., known by the system) and predetermined timed intervals. In some embodiments, these predetermined timed intervals may be determined/calculated/modified per step 701 and/or per step 740. In some embodiments, step 740 may lead into step 735. In some embodiments, step 740 may be a step of determining/calculating/modifying a time interval for dropping waste capsules 25 into the wellhead 15a. In some embodiments, this step 740 may provide a timing mechanism/means, such that the waste capsules 25 inserted for falling effortlessly into the wellbore system in sequence without undesired congestion, collision, and/or crashes. In some embodiments, step 735 may progress into step 745.

Continuing discussing FIG. 7, in some embodiments, step 745 may be a step of dropping a waste capsule into the wellbore system. In some embodiments, step 745 may illustrate processes of releasing the waste capsules 25, at the predetermined timed intervals, into the disposal wellhead 15a, such that the dropped waste capsules 25 may fall into and through at least a portion of the wellbore system. In some embodiments, concurrent with step 745 may be step 750. In some embodiments, step 750 may be a step of counting a quantity of waste capsules 25 that have been dropped into the wellbore system. In some embodiments, step 745 may progress into step 730.

Continuing discussing FIG. 7, in some embodiments, step 730 may be a step of checking the total quantity of waste capsules 25 that have been dropped into the wellhead 15a. In some embodiments, step 730 may feed/loop back into step 720. In some embodiments, step 730 may illustrate a process in which a check or audit is made of a total quantity of waste capsules 25 which have been disposed of (i.e., released and dropped) within that wellhead 15a. If the required quantity has not been reached, then step 730 returns method 700 to step 720 to reinitiate the selection of another waste capsule 25 for insertion into the wellhead 15a. If the required quantity has been reached, then step 730 progresses to step 755.

Continuing discussing FIG. 7, in some embodiments, step 755 may be a final step in method 700. In some embodiments, step 755 may be a step of sealing wellbores, sealing human-made cavern(s) 40, and/or closing the wellhead 15a. In some embodiments, in step 755 the wellbores and/or the human-made cavern(s) 40 may be sealed as required by regulatory requirements and/or practices. In some embodiments, in step 755, injected sealing fluid 27a may be designed and/or implement this sealing process. As noted above (e.g., in the FIG. 1B discussion), injected sealing fluid 27a may be injected as a flowable slurry and/or cement, that may cure and harden around the disposed of waste capsules 25. As noted above, injected sealing fluid 27a may form a consolidated monolithic byproduct with the disposed of waste capsules 25, in the wellbore(s) and/or in the human-made cavern(s) 40. In practice injected sealing fluid 27a may be designed by varying its physical and rheological properties. Among such properties that may be manipulated are for example, density, viscosity, settling time, and/or flowability or pumpability of the injected sealing fluid 27a, which upon injection may be a flowable slurry and/or cement. All of these modifying methods and processes are well known in an industry where cement modification, injection and pumping applications have been performed millions of times worldwide. When "set up" (cured and/or hardened) injected sealing fluid 27a may provide an almost impermeable matrix with the disposed of waste capsules 25, that may be long lived in terms of geologic time scales, and generally immovable. In some embodiments, injected sealing fluid 27a may injected into the disposal system via secondary support or intercept wellbore 15b and/or via the other main wellbores.

Systems and methods for the self-loading in deep geological storage of waste capsules have been described. The foregoing description of the various embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A waste capsule, wherein the waste capsule is configured for:
   (a) receiving and housing a predetermined quantity of waste;
   (b) being finally disposed of within a distal portion of a wellbore or in a human-made cavern, wherein the distal portion or the human-made cavern is located within a deep geological formation that is at least five thousand feet below the Earth's surface; and
   (c) falling within both a wellbore viscous fluid and the wellbore, wherein the wellbore includes the wellbore viscous fluid;
   wherein the waste capsule is a substantially elongate cylindrical member, comprising a conical nose, a capsule body, and a tail end; wherein the conical nose is connected to the capsule body, the capsule body is also connected to the tail end, such that the capsule body is disposed of between the conical nose and the tail end, wherein the capsule body is substantially hollow and is configured to receive and house the predetermined quantity of waste;
   wherein the conical nose is conical in shape terminating at a tip that is pointed or wherein the conical nose is dome shaped, wherein the tip is furthest away from the tail end and wherein the tip is colinear with a longitudinal axis of the waste capsule;
   wherein the tail end comprises at least one stabilizer that extends orthogonally away from an exterior side wall of the capsule body and that extends beyond an outer diameter of the capsule body, wherein the at least one stabilizer is configured to minimize instability of the waste capsule when the waste capsules falls within the wellbore viscous fluid and falls within the wellbore;
   wherein the conical nose comprises a first connector; wherein the first connector is configured to attach to a connector of a tail end of a different waste capsule.

2. The waste capsule according to claim 1, wherein an exterior shape of the waste capsule is substantially smooth and streamlined to minimize friction against the wellbore viscous fluid.

3. The waste capsule according to claim 1, wherein the tail end comprises a second connector; wherein the second connector is configured to attach to a connector of a conical nose of another waste capsule.

4. The waste capsule according to claim 1, wherein the at least one stabilizer is one or more of: internal fins, external fins, or drag vanes.

5. The waste capsule according to claim 1, wherein the capsule body comprises at least one centralizer, wherein the at least one centralizer is configured to keep the waste capsule substantially within a center of the wellbore when the waste capsule is falling within the wellbore.

6. The waste capsule according to claim 1, wherein the conical nose comprises at least one crash attenuator, wherein the at least one crash attenuator is configured to absorb at least some energy from an impact on the waste capsule such that a rupture of the capsule body is minimized.

7. A waste capsule, wherein the waste capsule is configured for:
(a) receiving and housing a predetermined quantity of waste;
(b) being finally disposed of within a distal portion of a wellbore or in a human-made cavern, wherein the distal portion or the human-made cavern is located within a deep geological formation that is at least five thousand feet below the Earth's surface; and
(c) falling within both a wellbore viscous fluid and the wellbore, wherein the wellbore includes the wellbore viscous fluid;
wherein the waste capsule is a substantially elongate cylindrical member, comprising a conical nose, a capsule body, and a tail end; wherein the conical nose is connected to the capsule body, the capsule body is also connected to the tail end, such that the capsule body is disposed of between the conical nose and the tail end, wherein the capsule body is substantially hollow and is configured to receive and house the predetermined quantity of waste;
wherein the conical nose is conical in shape terminating at a tip that is pointed or wherein the conical nose is dome shaped, wherein the tip is furthest away from the tail end and wherein the tip is colinear with a longitudinal axis of the waste capsule;
wherein the tail end comprises at least one stabilizer that extends orthogonally away from an exterior side wall of the capsule body and that extends beyond an outer diameter of the capsule body, wherein the at least one stabilizer is configured to minimize instability of the waste capsule when the waste capsules falls within the wellbore viscous fluid and falls within the wellbore;
wherein the tail end comprises a first connector; wherein the first connector is configured to attach to a second connector of a conical nose of a different waste capsule.

8. A waste capsule, wherein the waste capsule is configured for:
(a) receiving and housing a predetermined quantity of waste;
(b) being finally disposed of within a distal portion of a wellbore or in a human-made cavern, wherein the distal portion or the human-made cavern is located within a deep geological formation that is at least five thousand feet below the Earth's surface; and
(c) falling within both a wellbore viscous fluid and the wellbore, wherein the wellbore includes the wellbore viscous fluid;
wherein the waste capsule is a substantially elongate cylindrical member, comprising a conical nose, a capsule body, and a tail end; wherein the conical nose is connected to the capsule body, the capsule body is also connected to the tail end, such that the capsule body is disposed of between the conical nose and the tail end, wherein the capsule body is substantially hollow and is configured to receive and house the predetermined quantity of waste;
wherein the conical nose is conical in shape terminating at a tip that is pointed or wherein the conical nose is dome shaped, wherein the tip is furthest away from the tail end and wherein the tip is colinear with a longitudinal axis of the waste capsule;
wherein the conical nose comprises at least one crash attenuator, wherein the at least one crash attenuator is configured to absorb at least some energy from an impact on the waste capsule such that a rupture of the capsule body is minimized;
wherein the tail end comprises at least one stabilizer that extends orthogonally away from an exterior side wall of the capsule body and that extends beyond an outer diameter of the capsule body, wherein the at least one stabilizer is configured to minimize instability of the waste capsule when the waste capsules falls within the wellbore viscous fluid and falls within the wellbore.

* * * * *